(12) United States Patent
Naruse

(10) Patent No.: US 10,200,526 B2
(45) Date of Patent: Feb. 5, 2019

(54) INFORMATION PROCESSING DEVICE, INFORMATION PROCESSING METHOD, AND PROGRAM

(71) Applicant: SONY MOBILE COMMUNICATIONS INC., Tokyo (JP)

(72) Inventor: Tetsuya Naruse, Kanagawa (JP)

(73) Assignee: SONY MOBILE COMMUNICATIONS INC., Tokyo (JP)

( * ) Notice: Subject to any disclaimer, the term of this patent is extended or adjusted under 35 U.S.C. 154(b) by 0 days.

(21) Appl. No.: 15/405,646

(22) Filed: Jan. 13, 2017

(65) Prior Publication Data

US 2017/0251095 A1    Aug. 31, 2017

(30) Foreign Application Priority Data

Feb. 26, 2016    (JP) .................. 2016-036017

(51) Int. Cl.
| | |
|---|---|
| H04W 4/00 | (2018.01) |
| H04M 1/725 | (2006.01) |
| H04L 12/28 | (2006.01) |
| G06F 3/0488 | (2013.01) |
| G06F 3/00 | (2006.01) |
| H04N 5/44 | (2011.01) |
| H04N 21/422 | (2011.01) |
| G06F 3/0354 | (2013.01) |

(52) U.S. Cl.
CPC ........ *H04M 1/72533* (2013.01); *G06F 3/005* (2013.01); *G06F 3/03547* (2013.01); *G06F 3/0488* (2013.01); *H04L 12/283* (2013.01); *H04N 5/4403* (2013.01); *H04N 21/42207* (2013.01); *H04N 21/42225* (2013.01); *G08C 2201/20* (2013.01); *H04N 2005/443* (2013.01); *H04N 2005/4408* (2013.01); *H04N 2005/4425* (2013.01); *H04N 2005/4435* (2013.01)

(58) Field of Classification Search
CPC .. H04W 4/005; H04W 88/021; G05D 1/0011; B64C 39/024; H04N 5/44504; G06K 9/46; G06F 17/30253; G08C 17/02
USPC .................... 455/41.1, 66.1, 456.1; 348/570; 382/182; 725/93
See application file for complete search history.

(56) References Cited

U.S. PATENT DOCUMENTS

| | | | |
|---|---|---|---|
| 2006/0168618 | A1 | 7/2006 | Choi |
| 2007/0080845 | A1 | 4/2007 | Amand |

(Continued)

FOREIGN PATENT DOCUMENTS

| | | |
|---|---|---|
| CN | 102819946 A | 12/2012 |
| JP | 2009-246646 | 10/2009 |
| JP | 2009-246646 A | 10/2009 |

OTHER PUBLICATIONS

Extended European Search Report dated Jul. 25, 2017 in Patent Application No. 17153340.9.

*Primary Examiner* — Phuoc H Doan
(74) *Attorney, Agent, or Firm* — Xsensus, LLP

(57) ABSTRACT

There is provided an information processing device, including a processing unit configured to associate, based on a captured image obtained by imaging a remote controller including an operation device and an operation signal transmitted from the remote controller in response to an operation on the operation device, the operated operation device with the operation signal.

21 Claims, 13 Drawing Sheets

(56) References Cited

U.S. PATENT DOCUMENTS

2008/0247757 A1    10/2008  Um et al.
2013/0247117 A1*    9/2013  Yamada ................. G08C 17/02
                                                        725/93
2017/0256288 A1*    9/2017  Ai ........................ G11B 27/036

* cited by examiner

FIG. 1B
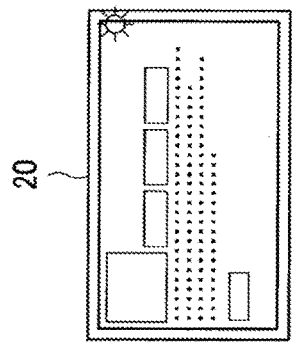
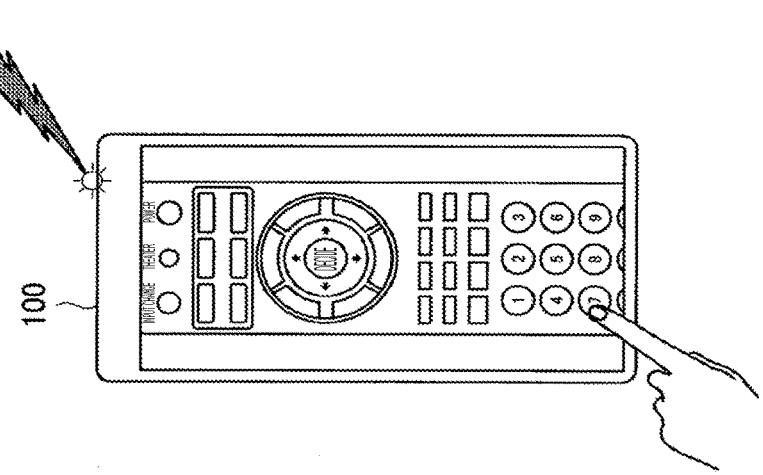

INFORMATION PROCESSING DEVICE, INFORMATION PROCESSING METHOD, AND PROGRAM

CROSS REFERENCE TO RELATED APPLICATIONS

This application claims the benefit of Japanese Priority Patent Application JP 2016-036017 filed Feb. 26, 2016, the entire contents of which are incorporated herein by reference.

BACKGROUND

The present disclosure relates to an information processing device, an information processing method, and a program.

A technique of causing a virtual remote controller capable of performing an operation based on a captured image obtained by imaging a remote controller capable of performing an operation to be displayed on a display screen has been developed. As a technique of causing such a virtual remote controller to be displayed on a display screen, for example, a technique disclosed in JP 2009-246646A is known.

SUMMARY

For example, when the technique disclosed in JP 2009-246646A is used, a virtual remote controller including a virtual control key (an example of a virtual operation device) is displayed on a display screen. Further, for example, when the technique disclosed in JP 2009-246646A is used, a key operation can be performed on a control key displayed on the display screen.

However, for example, when the technique disclosed in JP 2009-246646A is used, it is necessary to manually associate a signal according to an operation for controlling a control target device which is transmitted from the remote controller (hereinafter referred to as an "operation signal") with the virtual operation device in the virtual remote controller. Further, for example, in the technique disclosed in JP 2009-246646A, associating the operation device operated in the remote controller with the operation signal transmitted from the remote controller is not considered. For this reason, for example, when the technique disclosed in JP 2009-246646A is used, the virtual operation device manually associated with the operation signal in the virtual remote controller may not correspond to the operation device actually operated in the remote controller.

The present disclosure proposes an information processing device, an information processing method, and a program, which are novel and improved and capable of associating an operation device operated in a remote controller with an operation signal transmitted from the remote controller according to the operation.

According to an embodiment of the present disclosure, there is provided an information processing device, including a processing unit configured to associate, based on a captured image obtained by imaging a remote controller including an operation device and an operation signal transmitted from the remote controller in response to an operation on the operation device, the operated operation device with the operation signal.

According to an embodiment of the present disclosure, there is provided an information processing device, including: a receiving unit configured to receive an operation signal transmitted from a remote controller in response to an operation on an operation device included in the remote controller; a communication unit configured to perform communication with an external device capable of recognizing the operated operation device based on a captured image obtained by imaging the remote controller; and a processing unit configured to associate the operated operation device with the operation signal based on a recognition result of the operated operation device transmitted from the external device and the operation signal transmitted from the remote controller.

According to an embodiment of the present disclosure, there is provided an information processing method performed in an information processing device, including: associating, based on a captured image obtained by imaging a remote controller including an operation device and an operation signal transmitted from the remote controller in response to an operation on the operation device, the operated operation device with the operation signal.

According to an embodiment of the present disclosure, there is provided an information processing method performed in an information processing device, including: associating, based on a recognition result of an operated operation device transmitted from an external device capable of recognizing the operated operation device based on a captured image obtained by imaging a remote controller including the operation device and an operation signal according to the operation transmitted from the remote controller, the operated operation device with the operation signal.

According to an embodiment of the present disclosure, there is provided a program for causing a computer to execute a function of: associating, based on a captured image obtained by imaging a remote controller including an operation device and an operation signal transmitted from the remote controller in response to an operation on the operation device, the operated operation device with the operation signal.

According to the present disclosure, it is possible to associate an operation device operated in a remote controller with an operation signal transmitted from the remote controller according to the operation.

Note that the effects described above are not necessarily limitative. With or in the place of the above effects, there may be achieved any one of the effects described in this specification or other effects that may be grasped from this specification.

BRIEF DESCRIPTION OF THE DRAWINGS

FIG. 1B is an explanatory diagram illustrating an example of a use case implemented by a process related to control in the information processing method according to the first embodiment;

DETAILED DESCRIPTION OF THE EMBODIMENT(S)

Figure 1A:
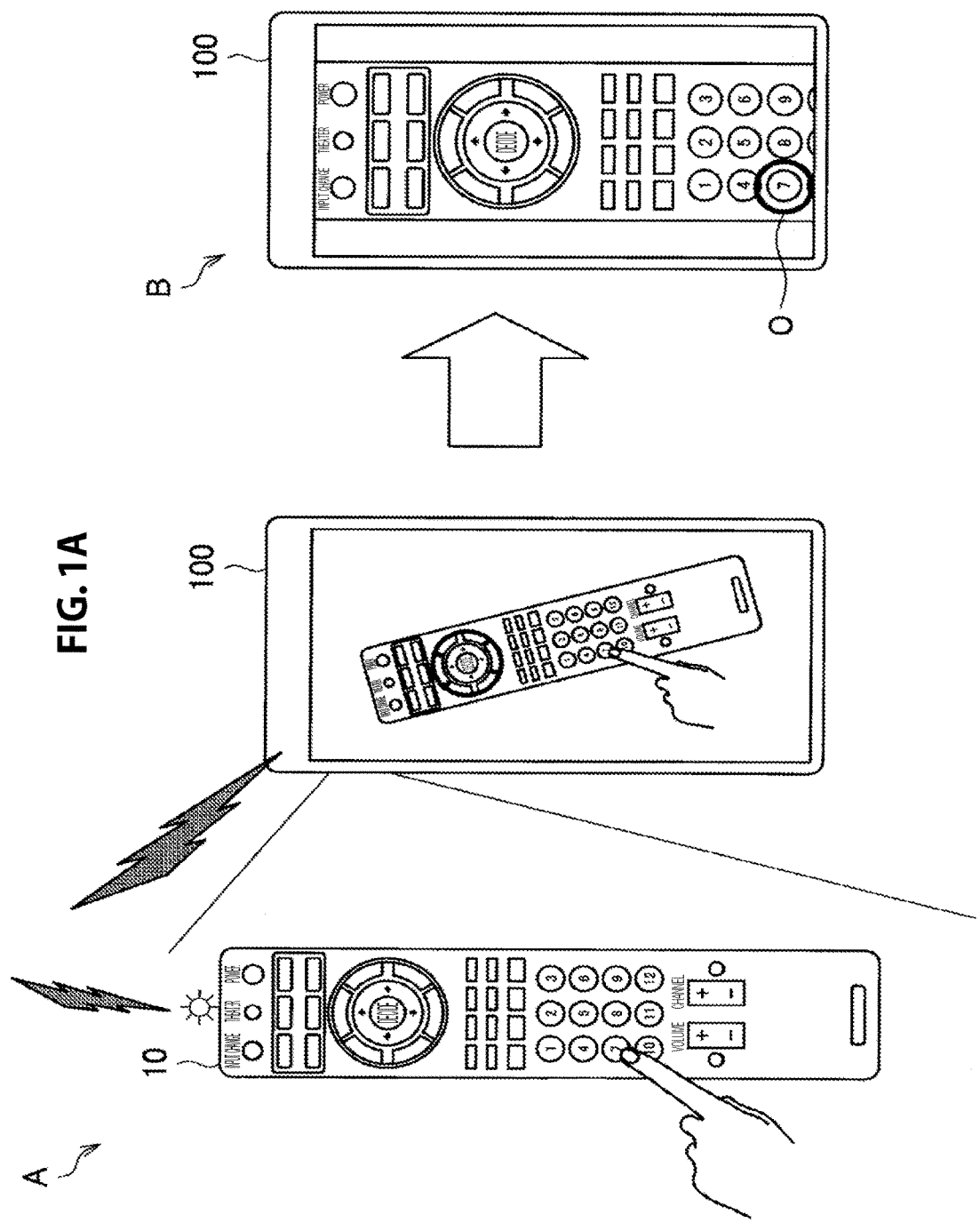
FIG. 1A is an explanatory diagram illustrating an example of a use case implemented by a process related to registration in an information processing method according to a first embodiment.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Hereinafter, the description will proceed in the following order.

1. Information processing method according to first embodiment
2. Information processing device according to first embodiment
3. Information processing method according to second embodiment
4. Information processing device according to second embodiment
5. Program according to present embodiment (Information Processing Method According to First Embodiment)

First, an information processing method according to a first embodiment will be described. An example in which a process related to the information processing method according to the first embodiment is performed by the information processing device according to the first embodiment will be described.

[1] Process Related to Information Processing Method According to First Embodiment As described above, for example, when the technique disclosed in JP 2009-246646A is used, it is necessary to manually associate the operation signal with the virtual operation device in the virtual remote controller. Further, for example, when the technique disclosed in JP 2009-246646A is used, the virtual operation device manually associated with the operation signal in the virtual remote controller may not correspond to the operation device actually operated in the remote controller.

Further, as a method of associating the operation device operated in the remote controller with the operation signal, for example, a "method using data specifying a relation between the operation device included in the remote controller and the operation signal such as data indicating a model number of the remote controller" is considered.

However, when the above method is used, for example, if the data indicating the model number of the remote controller is unable to be acquired, the operation device is unable to be associated with the operation signal.

In this regard, the information processing device according to the first embodiment performs a "process of associating the operated operation device with the operation signal based on a captured image obtained by imaging the remote controller including the operation device and the operation signal transmitted from the remote controller according to the operation on the operation device" (hereinafter referred to as an "associating process according to the first embodiment").

Here, the captured image according to the present embodiment is, for example, an image which is captured by an imaging device constituting an imaging unit (which will be described later) included in the information processing device according to the first embodiment or an external imaging device of the information processing device according to the first embodiment (a moving image or a still image). The information processing device according to the first embodiment uses the captured image acquired from the imaging device constituting the imaging unit (which will be described later) or the captured image acquired from the external imaging device in the associating process according to the first embodiment.

The operation signal transmitted from the remote controller is received by, for example, a communication device constituting a receiving unit (which will be described later) included in the information processing device according to the first embodiment or an external communication device of the information processing device according to the first embodiment. The information processing device according to the first embodiment uses the operation signal received by the communication device constituting the receiving unit (which will be described later) or the operation signal received by the external communication device in the associating process according to the first embodiment.

More specifically, the information processing device according to the first embodiment recognizes the operation device operated in the remote controller based on the captured image.

Here, the information processing device according to the first embodiment recognizes the operation device operated in the remote controller by performing an arbitrary object recognition process on the captured image and detecting the remote controller, the operation device such as a button included in the remote controller, and an operating body such as a hand of the user who operates the operation device.

The information processing device according to the first embodiment may further perform one or more types of image processing such as distortion correction and tone correction on the captured image. By further performing distortion correction, tone correction, and the like, it is possible to improve the accuracy of recognition of the operated operation device based on the captured image.

A method of improving the accuracy of recognition of the operated operation device is not limited to the above example.

For example, when depth information indicating the depth of the operating body for the remote controller is obtained from the captured image, for example, when the captured image is a stereo image generated by a stereo camera, the information processing device according to the first embodiment can improve the accuracy of recognition of the operated operation device based on the captured image by further considering the depth indicated by the depth information.

Further, when a thermal image obtained by imaging the remote controller is acquired, the information processing device according to the first embodiment can improve the accuracy of recognition of the operated operation device based on the captured image by considering the temperature of the remote controller indicated by the acquired thermal image.

For example, as described above, when the operated operation device is recognized based on the captured image, the information processing device according to the first embodiment associates the recognized operation device with the operation signal transmitted from the remote controller. The information processing device according to the first embodiment associates the recognized operation device with the operation signal, for example, by recording the recognized operation device and the operation signal in a table in which the operation devices are associated with the operation signals in a one-to-one manner (or a database; the same hereinafter). A specific example of correspondence between the operation device and the operation signal according to the present embodiment will be described.

When the associating process according to the first embodiment is performed as the process related to the information processing method according to the first embodiment, the operated operation device is recognized based on the captured image obtained by imaging an operation performed on the remote controller by the operating body.

In response to the operation performed on the remote controller by the operating body, the remote controller transmits the operation signal according to the operation. In other words, when the operated operation device is recognized based on the captured image in the information processing device according to the first embodiment, the operation signal received in the information processing device according to the first embodiment is likely to be a transmission signal transmitted from the remote controller in response to the operation.

Thus, the information processing device according to the first embodiment can associate the operation device operated in the remote controller with the operation signal transmitted from the remote controller in response to the operation by performing the associating process according to the first embodiment.

Further, as described above, the information processing device according to the first embodiment recognizes the operated operation device based on the captured image, and associates the operation device recognized based on the captured image with the operation signal transmitted from the remote controller. Thus, for example, the user of the information processing device according to the first embodiment need not associate the operation device with the operation signal manually. Further, the information processing device according to the first embodiment can associate the operation device with the operation signal regardless of the data indicating the model number of the remote controller or the like.

[2] Other Process Related to Information Processing Method According to First Embodiment The process related to the information processing method according to the first embodiment is not limited to the associating process according to the first embodiment.

For example, the information processing device according to the first embodiment can further perform a "process of causing a generated virtual remote controller to be displayed on a display screen and controlling the virtual remote controller" (hereinafter referred to as a "virtual remote controller control process").

Here, the virtual remote controller includes a virtual operation device by which an operation can be performed and to which the operation device associated with the operation signal by the associating process according to the first embodiment corresponds. Hereinafter, the virtual operation device corresponding to the operation device associated with the operation signal by the associating process according to the first embodiment is also referred to as a "virtual operation device corresponding to the operation device" or simply as a "virtual operation device."

As the virtual operation device corresponding to the operation device, for example, there is a virtual operation device in which one or more of a type of operation device, a shape of an operation device, and a sign attached to an operation device are identical to those of the operation device.

As an operation on the virtual operation device, for example, there are the following examples:
  a direct operation by an arbitrary operating body such as the hand of the user on the virtual operation device displayed on the display screen (for example, when a display device constituting the display screen is a device capable of performing display and receiving a user operation such as a touch panel); and
  an indirect operation on the virtual operation device displayed on the display screen by operating a physical operation device such as a physical button (for example, when the display device constituting the display screen is a device capable of performing display and receiving a user operation or a device capable of performing only display).

Further, as an arrangement of virtual operation devices in the virtual remote controller generated by the information processing device according to the first embodiment, for example, there are the following examples:
  an arrangement of virtual operation devices in the virtual remote controller is identical to an arrangement of operation devices in the remote controller; and
  an arrangement of virtual operation devices in the virtual remote controller is different from an arrangement of operation devices in the remote controller.

When the information processing device according to the first embodiment generates a "virtual remote controller in which an arrangement of virtual operation devices is identical to an arrangement of operation devices in the remote controller," the virtual remote controller displayed on the display screen has a layout based on the remote controller. Thus, when the "virtual remote controller in which an arrangement of virtual operation devices is identical to an arrangement of operation devices in the remote controller" is generated, the information processing device according to the first embodiment can generate a virtual remote controller capable of implementing operability similar to that of the physical remote controller.

When the information processing device according to the first embodiment generates a "virtual remote controller in which an arrangement of virtual operation devices is different from an arrangement of operation devices in the remote controller," the virtual remote controller displayed on the display screen has a layout which is not based on the remote controller. Thus, when the "virtual remote controller in which an arrangement of virtual operation devices is different from an arrangement of operation devices in the remote controller" is generated, the information processing device according to the first embodiment can generate a virtual remote controller that is high in a degree of layout freedom.

The information processing device according to the first embodiment generates either or both of the "virtual remote controller in which an arrangement of virtual operation devices is identical to an arrangement of operation devices in the remote controller" and the "virtual remote controller in which an arrangement of virtual operation devices is different from an arrangement of operation devices in the remote controller."

The information processing device according to the first embodiment generates one of the "virtual remote controller in which an arrangement of virtual operation devices is identical to an arrangement of operation devices in the remote controller" and the "virtual remote controller in which an arrangement of virtual operation devices is different from an arrangement of operation devices in the remote controller" based on, for example, a setting related to generation of the virtual remote controller. Here, the setting related to generation of the virtual remote controller may be a fixed setting or may be a variable setting which can be changed based on an operation performed by the user or the like.

Further, for example, when the information processing device according to the first embodiment generates both of the "virtual remote controller in which an arrangement of virtual operation devices is identical to an arrangement of operation devices in the remote controller" and the "virtual remote controller in which an arrangement of virtual operation devices is different from an arrangement of operation devices in the remote controller," the information processing device according to the first embodiment may cause a selection screen on which the user can select the virtual remote controller to be displayed on the display screen. When the selection screen is displayed on the display screen, it is possible to allow the user to select the virtual remote controller which is easier for the user who uses the virtual remote controller to use. Thus, when the selection screen is displayed on the display screen, the information processing device according to the first embodiment can improve convenience for the user.

Further, the virtual remote controller generated by the information processing device according to the first embodiment may be configured with, for example, only the virtual operation devices corresponding to the operation devices or may be configured to include an object on which an operation is not allowed.

When the generated virtual remote controller is configured with the virtual operation devices corresponding to the operation devices, the user who operates the virtual remote controller can recognize the virtual operation device more easily.

Further, the information processing device according to the first embodiment may explicitly indicate the virtual operation devices included in the virtual remote controller. The information processing device according to the first embodiment explicitly indicates the virtual operation device, for example, by blinking the virtual operation device, surrounding the virtual operation device with a frame, or an arbitrary expression capable of visually notifying the user who operates the virtual remote controller of the presence of the virtual operation device.

When the virtual operation device is explicitly indicated by an arbitrary expression, the user who operates the virtual remote controller can recognize the virtual operation device more easily.

For example, the information processing device according to the first embodiment generates the virtual remote controller and causes the generated virtual remote controller to be displayed on the display screen.

In the virtual remote controller displayed on the display screen, when an operation on the virtual operation device is detected, the information processing device according to the first embodiment transmits an operation signal that corresponds to the virtual operation device in which an operation is detected and is associated with the operation device. Hereinafter, the operation signal associated with the operation device corresponding to the virtual operation device in which an operation is detected is also referred to as an "operation signal corresponding to the virtual operation device."

For example, the information processing device according to the first embodiment causes a communication device constituting a transmitting unit (which will be described later) included in the information processing device according to the first embodiment or an external communication device of the information processing device according to the first embodiment to transmit the operation signal corresponding to the virtual operation device. Here, the communication device constituting the transmitting unit (which will be described later) and the communication device constituting the receiving unit (which will be described later) may be the same communication device or may be different communication devices. Similarly, the external communication device that transmits the operation signal corresponding to the virtual operation device and the external communication device that receives the operation signal transmitted from the remote controller may be the same communication device or may be different communication devices.

[3] Specific Example of Process Related to Information Processing Method According to First Embodiment Next, a specific example of the process related to the information processing method according to the first embodiment will be described.

FIG. 1A is an explanatory diagram illustrating an example of a use case implemented by a process related to registration in the information processing method according to the first embodiment. FIG. 1B is an explanatory diagram illustrating an example of a use case implemented by a process related to control in the information processing method according to the first embodiment. In FIGS. 1A and 1B, a device denoted by reference numeral 100 corresponds to an example of the information processing device according to the first embodiment. In FIG. 1A, a device denoted by reference numeral 10 corresponds to an example of the remote controller, and in FIG. 1B, a device denoted by reference numeral 20 corresponds to an example of a device that is controlled by the remote controller (hereinafter referred to as a "control target").

Hereinafter, a device corresponding to the information processing device according to the first embodiment is referred to as an "information processing device 100." Further, hereinafter, a device corresponding to the remote controller is referred to as a "remote controller 10," and a device corresponding to the control target is referred to as a "control target 20." It will be appreciated that the information processing device 100, the remote controller 10, and the control target 20 are not limited to those illustrated in FIGS. 1A and 1B.

For example, when a remote controller application is executed in the information processing device 100, and a registration mode of the remote controller application is set, the imaging device constituting the imaging unit (which will be described later) included in the information processing device 100 is activated. For example, the setting of the registration mode in the remote controller application is performed based on an operation performed by the user of the information processing device 100. Further, the setting of the registration mode in the remote controller application is automatically performed when a predetermined condition is satisfied (for example, an initial state in which the operation device is not associated with the operation signal).

For example, the user of the information processing device 100 is assumed to perform an operation of pushing down a button (an example of the operation device) included in the remote controller 10 in a state in which the remote controller 10 is imaged by the imaging device as illustrated in A of FIG. 1A.

At this time, the information processing device 100 recognizes the button operated in the remote controller 10 based on the captured image. Further, the information processing device 100 receives the operation signal transmitted from the remote controller 10 through infrared communication or the like. Then, the information processing device 100 records, for example, the recognized button and the received operation signal in the table in association with each other. For example, the table in which the operation devices are associated with the operation signals according to the present embodiment is stored in a recording medium constituting a storage unit (which will be described later) included in the information processing device 100 or an external recording medium of the information processing device 100.

Figure 2:
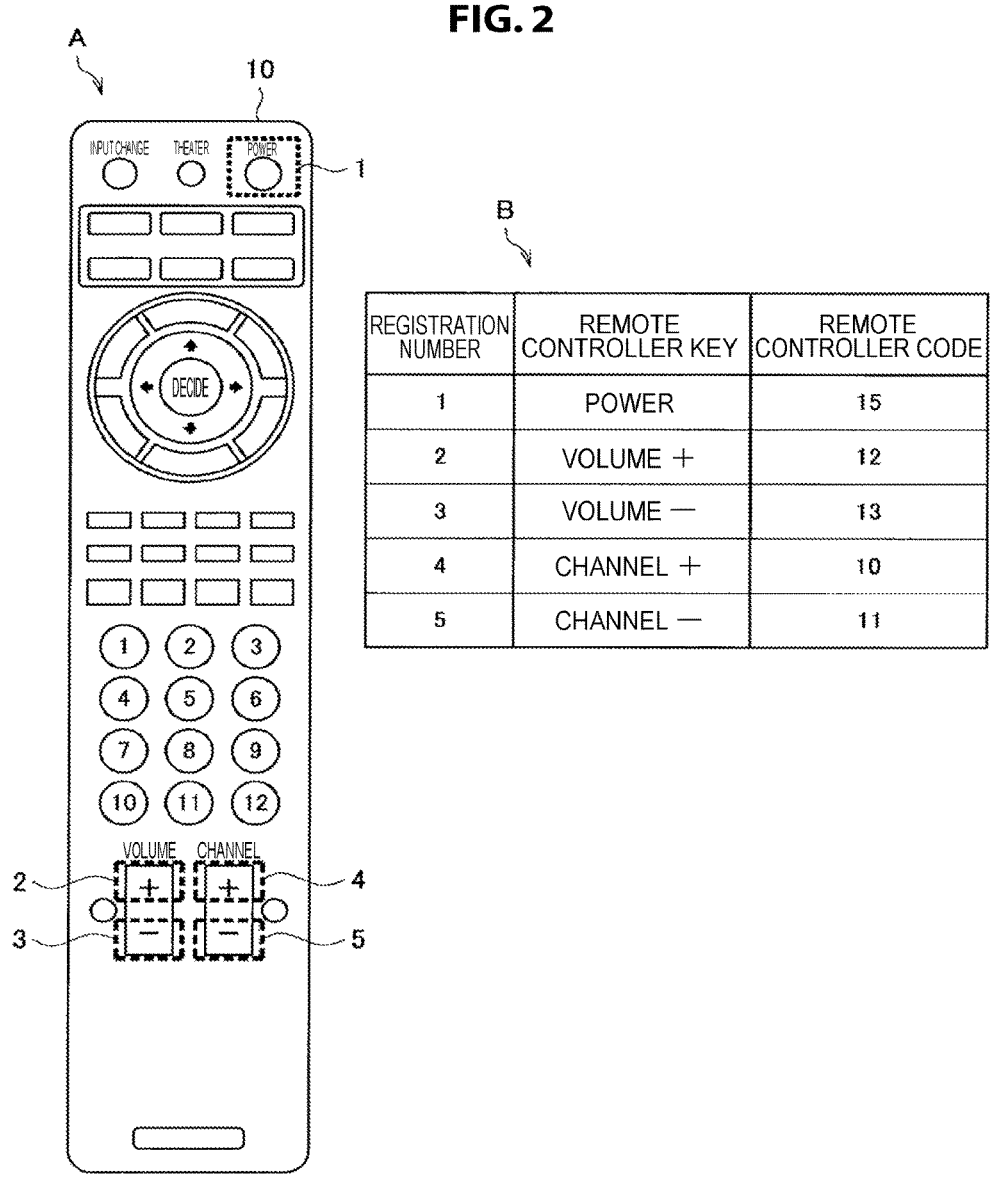
FIG. 2 is an explanatory diagram illustrating an example of a table in which operation devices are associated with operation signals according to the present embodiment.

FIG. 2 is an explanatory diagram illustrating an example of the table in which the operation devices are associated with the operation signals according to the present embodiment. A of FIG. 2 illustrates the remote controller 10, and B of FIG. 2 illustrates an example of the table in which the operation devices are associated with the operation signals.

Here, "remote controller keys" illustrated in B of FIG. 2 indicates names of operated operation devices. In the table illustrated in B of FIG. 2, data recorded in a column of "remote controller keys" corresponds to an example of recognition results of operated operation devices. "Remote controller codes" illustrated in B of FIG. 2 indicates codes indicating processes corresponding to operated operation devices indicated by operation signals. In the table illustrated in B of FIG. 2, data recorded in a column of "remote controller code" corresponds to an example of data indicating operation signals.

For example, when a button indicated by reference numeral 1 is pushed down in A of FIG. 2, data indicated by a registration number 1 is recorded in the table illustrated in B of FIG. 2. Further, for example, when buttons indicated by reference numerals 2 to 5 are pushed down in A of FIG. 2, data indicated by registration numbers 2 to 5 is recorded in the table illustrated in B of FIG. 2.

The example of the table in which the operation devices are associated with the operation signals is not limited to the example illustrated in B of FIG. 2. For example, in the table in which the operation devices are associated with the operation signals, a raw waveform of the operation signal may be recorded, or a digital signal corresponding to the operation signal may be recorded. Instead of the "remote controller keys" illustrated in B of FIG. 2, arbitrary data indicating operated operation devices may be recorded in the table in which the operation devices are associated with the operation signals.

The information processing device 100 updates the table illustrated in B of FIG. 2 each time the operation device operated in the remote controller 10 is recognized based on, for example, the captured image. For example, when all buttons included in the remote controller 10 illustrated in A of FIG. 2 are pushed down, the buttons included in the remote controller 10 and the operation signals corresponding to the buttons are recorded in the table illustrated in B of FIG. 2 in association with each other.

For example, when the same operation device is operated twice or more in the remote controller 10, that is, when a record including the same "remote controller key" as the operated operation device and the same "remote controller code" as the operated operation device already exists in the table illustrated in B of FIG. 2, the information processing device 100 may overwrite and update the record which already exists in the table or may not update the table.

An example of a use case implemented by the process related to the information processing method according to the first embodiment will be described with reference back to FIGS. 1A and 1B.

When the control mode of the remote controller application is set, for example, the virtual remote controller is displayed on the display screen as illustrated in B of FIG. 1A. The setting of the control mode in the remote controller application is performed based on, for example, an operation performed by the user of the information processing device 100. The setting of the control mode in the remote controller application may be automatically performed when a predetermined condition related to an automatic setting of the registration mode is not satisfied.

Here, for example, a part of the virtual remote controller is displayed on the display screen as illustrated in B of FIG. 1A. The entire virtual remote controller may be displayed on the display screen. When a part of the virtual remote controller is displayed on the display screen, the virtual remote controller is likely to be displayed with a larger display size than when the entire virtual remote controller is displayed on the display screen. When a part of the virtual remote controller is displayed on the display screen, a part of the virtual remote controller displayed on the display screen is changed, for example, according to an operation performed by the user. Further, although not illustrated in B of FIG. 1A, when a part of the virtual remote controller is displayed on the display screen, a scroll bar or the like may be displayed.

Further, for example, as indicated by reference numeral O in B of FIG. 1A, the virtual operation device may be explicitly indicated in the virtual remote controller displayed on the display screen.

For example, when the user of the information processing device 100 operates a virtual button serving as the virtual operation device as illustrated in FIG. 1B, the information processing device 100 transmits the operation signal associated with the operated virtual button. Here, FIG. 1B illustrates an example in which the virtual remote controller is displayed on the display screen of the touch panel, and when the displayed virtual button is pushed down by a finger (an example of the direct operation on the display screen), the operation signal is transmitted.

The remote controller application executed in the information processing device 100 obtains a correspondence relation between the touch panel and the image related to the virtual remote controller, for example, when the virtual remote controller is displayed on the display screen. For example, the remote controller application obtains the correspondence relation between the touch panel and the image related to the virtual remote controller by mapping the remote controller based on the captured image. The remote controller application specifies the pushed virtual button based on the correspondence relation between the touch panel and the image related to the virtual remote controller. Then, the remote controller application transmits the operation signal associated with the pushed virtual button.

In response to the operation signal transmitted from the information processing device 100, the control target 20 performs a similar operation to that when the operation signal is transmitted from the remote controller 10.

Figure 3:
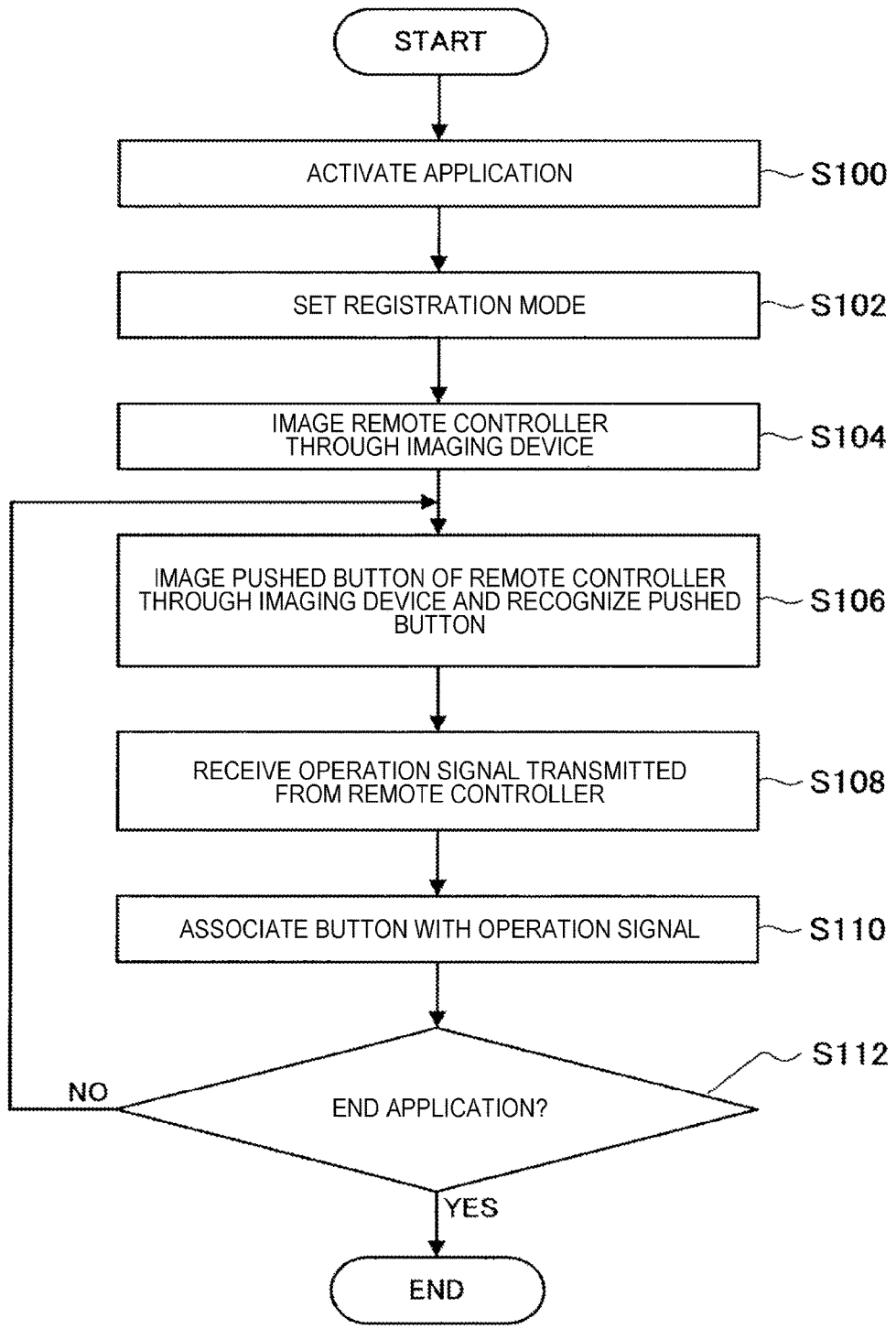
FIG. 3 is a flowchart illustrating an example of a process related to registration in the information processing method according to the first embodiment.
Figure 4:
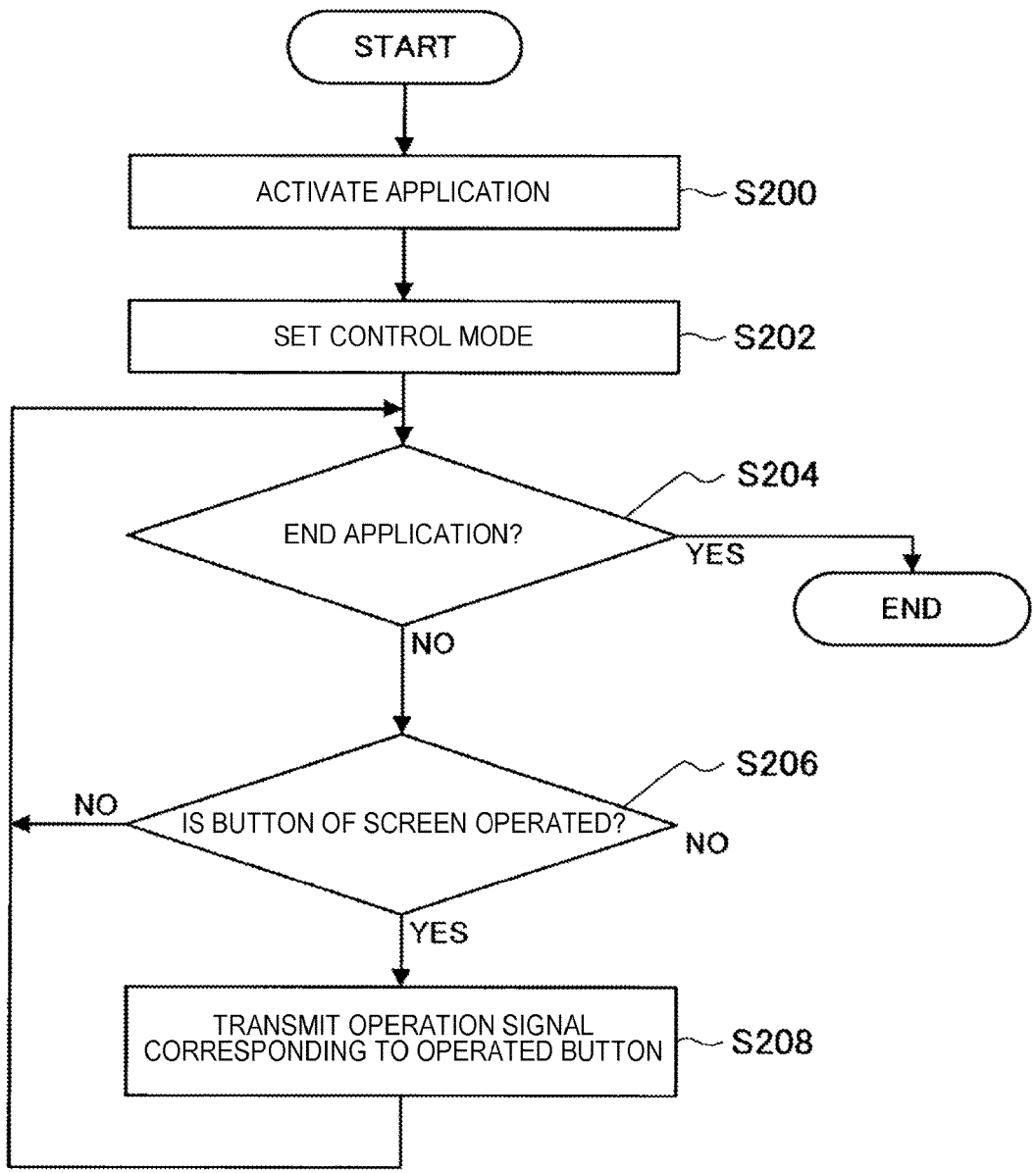
FIG. 4 is a flowchart illustrating an example of a process related to control in the information processing method according to the first embodiment.

FIG. 3 is a flowchart illustrating an example of a process related to registration in the information processing method according to the first embodiment, and FIG. 4 is a flowchart illustrating an example of a process related to control in the information processing method according to the first embodiment. The processes illustrated in FIGS. 3 and 4 are examples of processes related to the use case described above with reference to FIGS. 1A and 1B. FIG. 3 illustrates an example of a process when the registration mode of the remote controller application is selected, and FIG. 4 illustrates an example of a process when the control mode of the remote controller application is selected.

[3-1] Example of Process when Registration Mode of Remote Controller Application is Selected (FIG. 3)

The information processing device 100 activates the remote controller application based on an operation performed by the user or the like (S100), and sets the registration mode as the operation mode (S102).

The information processing device 100 controls, for example, the imaging device constituting the imaging unit (not illustrated) such that the remote controller 10 is imaged (S104).

When the button of the remote controller 10 pushed down by the user is imaged, the information processing device 100 recognizes the button pushed on the remote controller 10 based on the captured image (S106).

Further, the information processing device 100 receives the operation signal transmitted from the remote controller 10 (S108). FIG. 1 illustrates an example in which the process of step S108 is performed after the process of step S106, but the information processing device 100 can perform the process of step S106 and the process of step S108 in parallel according to an operation on the remote controller 10 by the user.

The information processing device 100 associates the button recognized in step S106 with the operation signal received in step S108 (S110). For example, the information processing device 100 associates the recognized button with the received operation signal by recording data corresponding to the button recognized in step S106 and data corresponding to the operation signal received in step S108 in the table illustrated in FIG. 2 in association with each other.

The information processing device 100 determines whether or not to end the remote controller application (S112). For example, when execution of an operation to end the remote controller application is detected, the information processing device 100 determines to end the remote controller application.

When the remote controller application is determined not to be ended in step S112, the information processing device 100 repeats the process starting from step S106.

Further, when the remote controller application is determined to be ended in step S112, the information processing device 100 ends the remote controller application being executed, and ends the process of FIG. 3.

[3-2] Example of Process when Control Mode of Remote Controller Application is Selected (FIG. 4)

The information processing device 100 activates the remote controller application based on an operation performed by the user or the like (S200), and sets the control mode as the operation mode (S202). For example, when the control mode is set, the virtual remote controller is displayed on the display screen.

The information processing device 100 determines whether or not to end the remote controller application, similarly to step S112 of FIG. 1 (S204).

When the remote controller application is determined not to be ended in step S204, the information processing device 100 determines whether or not the button displayed on the display screen is operated (S206). For example, when the virtual remote controller is displayed on the display screen of the touch panel, the information processing device 100 determines that the button displayed on the display screen is operated when a pushed button is specified based on the correspondence relation between the touch panel and the image related to the virtual remote controller.

When the button displayed on the display screen is determined not to be operated in step S206, the information processing device 100 repeats the process starting from step S204.

Further, when the button displayed on the display screen is determined to be operated in step S206, the information processing device 100 transmits the operation signal corresponding to the operated button (S208). Then, the information processing device 100 repeats the process starting from step S204.

When the remote controller application is determined to be ended in step S204, the information processing device 100 ends the remote controller application being executed, and ends the process of FIG. 4.

For example, the use case described above with reference to FIGS. 1A and 1B is implemented when the processes illustrated in FIGS. 3 and. 4 are performed in the information processing device 100. It will be appreciated that the example of the process related to the information processing method according to the first embodiment is not limited to the example illustrated in FIGS. 3 and 4.

(Information Processing Device According to First Embodiment)

Next, an example of a configuration of the information processing device according to the first embodiment which is capable of performing the process related to the information processing method according to the first embodiment will be described.

Figure 5:
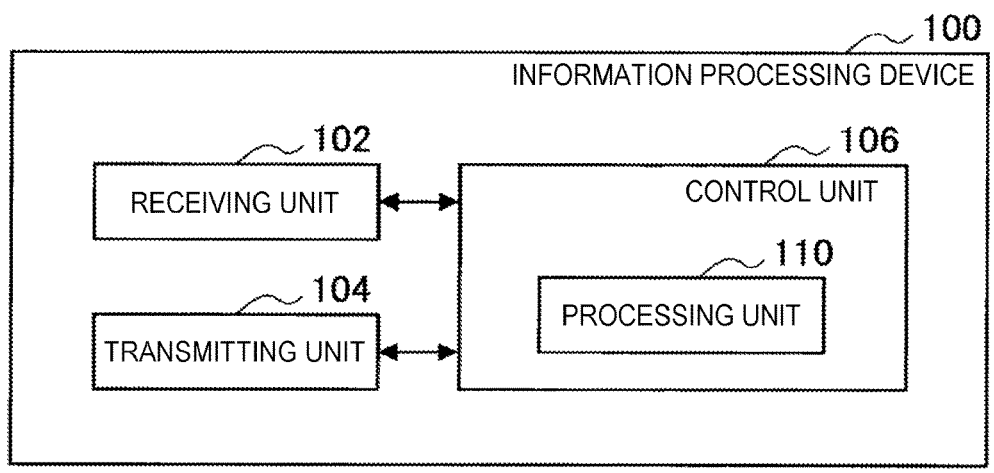
FIG. 5 is a block diagram illustrating an example of a configuration of an information processing device according to the first embodiment.

FIG. 5 is a block diagram illustrating an example of a configuration of the information processing device 100 according to the first embodiment. The information processing device 100 includes, for example, a receiving unit 102, a transmitting unit 104, and a control unit 106.

For example, the information processing device 100 may include a read only memory (ROM) (not illustrated), a random access memory (RAM) (not illustrated), a storage unit (not illustrated), an operation unit (not illustrated) that can be operated by the user of the information processing device 100, a display unit (not illustrated) that causes various screens to be displayed on the display screen, and the like. In the information processing device 100, the components are connected to one another, for example, by a bus serving as a data transmission path. For example, the information processing device 100 is driven by electric power supplied from an internal power source such as a battery included in the information processing device 100, electric power supplied from an external power source connected thereto, or the like.

The ROM (not illustrated) stores a program and control data such as operation parameters which are used by the control unit 106. The RAM (not illustrated) temporarily stores, for example, a program executed by the control unit 106.

The storage unit (not illustrated) is a storage device included in the information processing device 100, and stores various data, for example, data related to the information processing method according to the first embodiment such as the table in which the operation devices are associated with the operation signals or various kinds of applications such as the remote controller application. Here, examples of the storage unit (not illustrated) include a magnetic recording medium such as a hard disk (Hard Disk) and a non-volatile memory such as a flash memory. The storage unit (not illustrated) may be removably attached to the information processing device 100.

The operation unit (not illustrated) is an operation input device which will be described later. The display unit (not illustrated) is a display device which will be described later.

[Exemplary Hardware Configuration of Information Processing Device 100]

Figure 6:
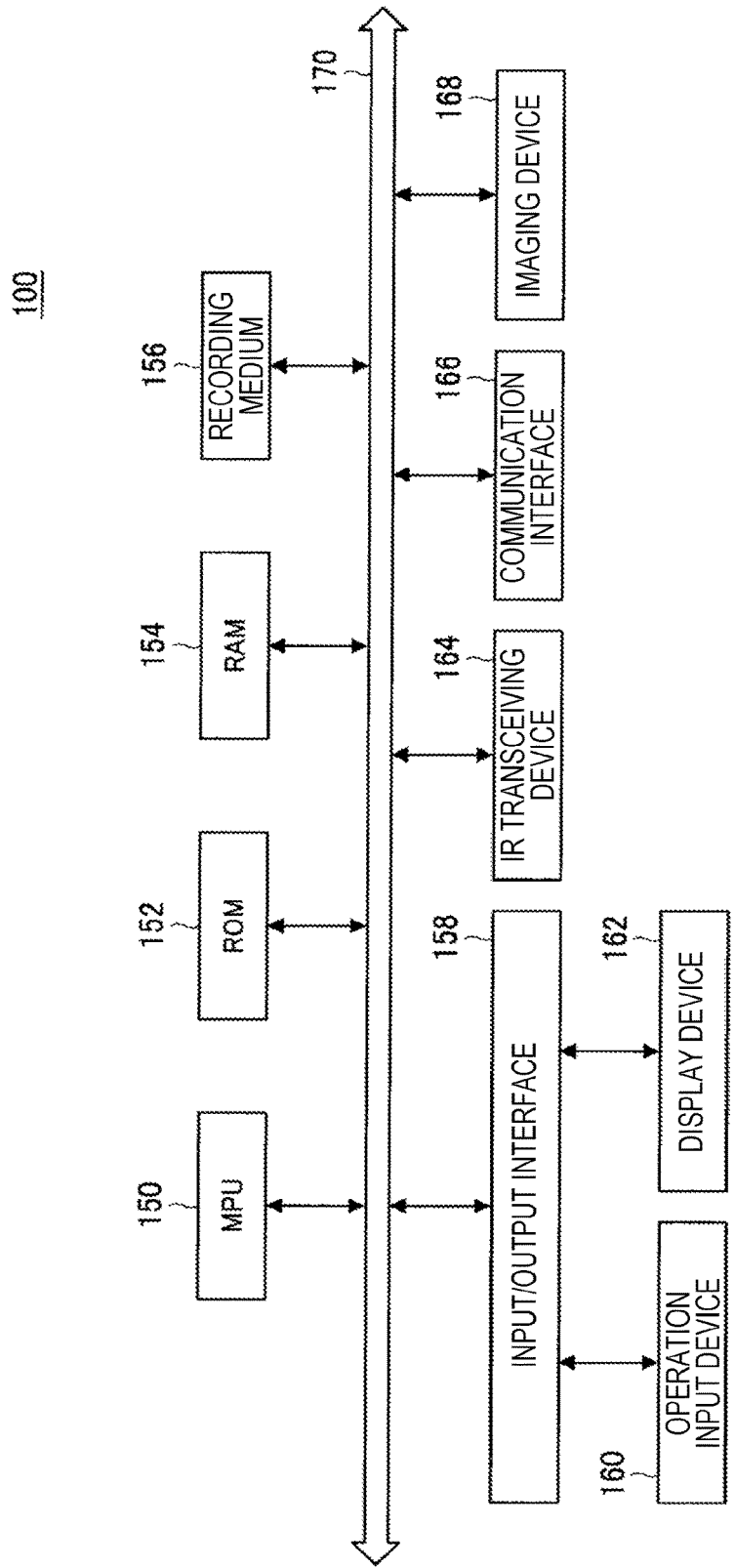
FIG. 6 is an explanatory diagram illustrating an example of a hardware configuration of the information processing device according to the first embodiment.

FIG. 6 is an explanatory diagram illustrating an example of a hardware configuration of the information processing device 100 according to the first embodiment. The information processing device 100 includes, for example, an MPU 150, a ROM 152, a RAM 154, a recording medium 156, an input/output interface 158, an operation input device 160, a display device 162, an IR transceiving device 164, a communication interface 166, and an imaging device 168. In the information processing device 100, the components are connected to one another, for example, by a bus 170 serving as a data transmission path.

The MPU 150 is configured with, for example, one or more processors configured with an operation circuit such as a micro processing unit (MPU), various kinds of processing circuits, and the like and functions as the control unit 106 that controls the information processing device 100 in general. The MPU 150 undertakes, for example, the role of a processing unit 110 (which will be described later) in the information processing device 100. The processing unit 110 may be configured with a dedicated (or general-purpose) circuit (for example, a processor separate from the MPU 150 or the like) capable of performing a process of the processing unit 110.

The ROM 152 stores a program used by the MPU 150, control data such as operation parameters, and the like. The RAM 154 temporarily stores, for example, a program executed by the MPU 150.

The recording medium 156 functions as a storage unit (not illustrated), and stores various data, for example, data related to the information processing method according to the first embodiment such as the table in which the operation devices are associated with the operation signals or various kinds of applications. Here, examples of the recording medium 156 include a magnetic recording medium such as a hard disk and a non-volatile memory such as a flash memory. The recording medium 156 may be removably attached to the information processing device 100.

The input/output interface 158 connects, for example, the operation input device 160 with the display device 162. The operation input device 160 functions as the operation unit (not illustrated), and the display device 162 functions as the display unit (not illustrated). Here, examples of the input/output interface 158 include a Universal Serial Bus (USB) terminal, a digital visual interface (DVI) terminal, a high-definition multimedia interface (HDMI) (registered trademark) terminal, and various kinds of processing circuits.

For example, the operation input device 160 is arranged on the information processing device 100 and connected with the input/output interface 158 in the information processing device 100. Examples of the operation input device 160 include a button, a direction key, a rotational selector such as a jog dial, and a combination thereof.

For example, the display device 162 is arranged on the information processing device 100 and connected with the input/output interface 158 in the information processing device 100. Examples of the display device 162 include a liquid crystal display (LCD) and an organic EL display (also called an organic electro-luminescence display or an organic light emitting diode display (OLED display)).

It will be appreciated that the input/output interface 158 can be connected with an external device such as an external operation input device of the information processing device 100 (for example, a keyboard, a mouse, or the like) or an external display device. The display device 162 may be, for example, a device on which display and a user operation can be performed such as the touch panel.

The IR transceiving device 164 is a communication device included in the information processing device 100 and performs transmission and reception of a signal through infrared rays. The IR transceiving device 164 functions as the receiving unit 102 that receives the transmission signal transmitted from the remote controller and the transmitting unit 104 that transmits the operation signal.

The communication interface 166 is another communication device included in the information processing device 100 and functions as a communication unit (not illustrated) that performs communication with an external device in a wireless or wired manner via a network (or directly). Here, examples of the communication interface 166 include a communication antenna and a radio frequency (RF) circuit (wireless communication), an IEEE 802.15.1 port and a transceiving circuit (wireless communication), an IEEE 802.11 port and a transceiving circuit (wireless communication), and a local area network (LAN) terminal and a transceiving circuit (wired communication).

The imaging device 168 is an imaging device included in the information processing device 100 and functions as the imaging unit (not illustrated). The imaging device 168 is configured to include, for example, a lens/imaging element and a signal processing circuit. The lens/imaging element is configured with, for example, a lens of an optical system and an image sensor using a plurality of imaging elements such as a complementary metal oxide semiconductor (CMOS) or a charge-coupled device (CCD). The signal processing circuit includes, for example, an automatic gain control (AGC) circuit and an analog to digital converter (ADC), and converts an analog signal generated by the imaging element into a digital signal (image data). For example, the signal processing circuit performs various kinds of processes related to RAW development. Further, the signal processing circuit may perform various kinds of signal processing such as a white balance correction process, a tone correction process, a gamma correction process, a YCbCr conversion process, and an edge enhancement process.

The information processing device 100 performs the process related to the information processing method according to the first embodiment through, for example, the configuration illustrated in FIG. 6. The hardware configuration of the information processing device 100 according to the first embodiment is not limited to the configuration illustrated in FIG. 6.

For example, the information processing device 100 may not include the IR transceiving device 164 when communication with an external device is performed through an external IR transceiving device connected thereto.

Instead of the IR transceiving device 164, for example, the information processing device 100 may include a communication device corresponding to an arbitrary communication scheme used for transmission of the operation signal by the remote controller. Here, the communication device corresponding to an arbitrary communication scheme used for transmission of the operation signal by the remote controller functions as the receiving unit 102 and the transmitting unit 104.

The information processing device 100 may include, for example, a communication device functioning as the receiving unit 102 and a communication device functioning as the transmitting unit 104.

Further, the information processing device 100 may not include the imaging device 168, for example, when imaging is performed through an external imaging device connected thereto.

Further, the information processing device 100 may have, for example, a configuration in which one or more of the recording medium 156, the operation input device 160, the display device 162, and the communication interface 166 are not arranged.

Further, the information processing device 100 may have, for example, a configuration according to an application example of the information processing device 100 which will be described later.

For example, a part or all of the configuration illustrated in FIG. 6 (or a configuration according to a modified example) may be implemented by one or more integrated circuits (ICs).

An example of a configuration of the information processing device 100 will be described with reference back to FIG. 5. The receiving unit 102 receives the operation signal transmitted from the remote controller. The receiving unit 102 is, for example, the IR transceiving device 164.

The transmitting unit 104 transmits the operation signal. The transmitting unit 104 is, for example, the IR transceiving device 164.

The control unit 106 is configured with, for example, an MPU or the like and undertakes a role of controlling the information processing device 100 in general. The control unit 106 includes, for example, the processing unit 110 and undertakes a role of initiatively performing the process related to the information processing method according to the first embodiment.

The processing unit 110 undertakes a role of initiatively performing the process related to the information processing method according to the first embodiment.

The processing unit 110 performs, for example, the associating process according to the first embodiment, and associates the operated operation device with the operation signal based on the captured image obtained by imaging the remote controller and the operation signal transmitted from the remote controller according to the operation on the operation device. The processing unit 110 associates the operated operation device with the operation signal based on, for example, the operation signal received by the receiving unit 102.

The processing unit 110 may further perform, for example, the virtual remote controller control process.

The processing unit 110 generates the virtual remote controller and causes the virtual remote controller to be displayed on the display screen. Then, the processing unit 110 controls the virtual remote controller based on, for example, an operation performed by the user on the virtual remote controller.

When an operation on the virtual operation device is detected, the processing unit 110 transmits the operation signal corresponding to the virtual operation device in which an operation is detected. The processing unit 110 transmits the operation signal to the transmitting unit 104.

The information processing device 100 performs the process related to the information processing method according to the first embodiment through, for example, the configuration illustrated in FIG. 5. Thus, the information processing device 100 can associate the operation device operated in the remote controller with the operation signal transmitted from the remote controller in response to the operation through, for example, the configuration illustrated in FIG. 5.

Further, the information processing device 100 can have an effect obtained by performing the process related to the information processing method according to the first embodiment through, for example, the configuration illustrated in FIG. 5.

The configuration of the information processing device according to the first embodiment is not limited to the configuration illustrated in FIG. 5.

For example, in the information processing device according to the first embodiment, the processing unit 110 illustrated in FIG. 5 may be arranged separately from the control unit 106 (for example, may be implemented by a separate processing circuit). The processing unit 110 may be implemented by a plurality of processing circuits, and the function of the processing unit 110 may be distributedly performed by a plurality of processing circuits.

The configuration for implementing the process related to the information processing method according to the first embodiment is not limited to the configuration illustrated in FIG. 5, and a configuration according to a division form of the process related to the information processing method according to the first embodiment may be employed.

Further, for example, when communication with an external device is performed through an external communication device with a function and configuration similar to those of the receiving unit 102, the information processing device according to the first embodiment may not include the receiving unit 102. When the information processing device according to the first embodiment is configured not to include the receiving unit 102, the processing unit 110 associates the operated operation device with the operation signal based on the operation signal received by the external communication device.

Further, for example, when communication with an external device is performed through an external communication device with a function and configuration similar to those of the transmitting unit 104, the information processing device according to the first embodiment may not include the transmitting unit 104. When the information processing device according to the first embodiment is configured not to include the transmitting unit 104, the processing unit 110 transmits the operation signal to the external communication device.

The information processing device according to the first embodiment may further include an imaging unit (not illustrated). When the imaging unit (not illustrated) is further arranged, the processing unit 110 associates the operated operation device with the operation signal based on the captured image generated by the imaging unit (not illustrated).

The information processing device has been described as the first embodiment, but the first embodiment is not limited to this example. For example, the first embodiment can be applied to various devices capable of performing the process related to the information processing method according to the first embodiment such as a "communication device such as a smart phone," a "computer such as a personal computer (PC)," an "arbitrary wearable device used in a state in which it is worn on the body of the user such as an eyeware type device, a clock type device, or a wristlet type device," a "tablet type device," an "imaging device such as a digital video camera or a digital still camera," a "game machine," and a "mobile object such as an automobile." For example, the first embodiment can be applied a processing IC that can be incorporated into the above devices.

(Information Processing Method According to Second Embodiment)

The first embodiment has been described in connection with the example in which the information processing device according to the first embodiment has the function of receiving the transmission signal transmitted from the remote controller and the function of transmitting the transmission signal.

However, the information processing device that performs the process related to the information processing method according to the first embodiment is not necessarily limited to one having the function of receiving the transmission signal transmitted from the remote controller and the function of transmitting the transmission signal.

In this regard, next, an information processing method that is applied to a device capable of relaying "transmission and reception of the transmission signal between the remote controller 10 and the information processing device 100 that performs the process related to the information processing method according to the first embodiment" and "transmission and reception of the transmission signal between the information processing device 100 and the control target 20" will be described as an information processing method according to the second embodiment. The following description will proceed with an example in which a process related to the information processing method according to the second embodiment is performed by the information processing device according to the second embodiment.

[I] Process Related to Information Processing Method According to Second Embodiment The information processing device according to the second embodiment performs the "process of associating the operated operation device with the operation signal based on a recognition result of the operation device operated in the remote controller which is transmitted from an external device and the operation signal transmitted from the remote controller" (hereinafter referred to as an "associating process according to the second embodiment").

Here, the recognition result of the operation device operated in the remote controller is a recognition result in the associating process according to the first embodiment, that is, a result of recognizing the operation device operated in the remote controller based on the captured image. The recognition result of the operation device operated in the remote controller is, for example, data indicating the operated operation device such as the data indicated by the "remote controller keys" illustrated in B of FIG. 2.

For example, the external device that transmits the recognition result of the operation device operated in the remote controller is, for example, a device capable of performing the process related to the information processing method according to the first embodiment such as the information processing device 100.

The information processing device according to the second embodiment performs communication with the external device such as the information processing device 100 through a communication device constituting a communication unit (which will be described later) included in the information processing device according to the second embodiment or an external communication device connected thereto.

The information processing device according to the second embodiment receives the transmission signal transmitted from the remote controller through the communication device constituting the receiving unit (which will be described later) included in the information processing device according to the second embodiment or the external communication device of the information processing device according to the second embodiment. The information processing device according to the second embodiment uses the operation signal received by the communication device constituting the receiving unit (which will be described later) or the operation signal received by the external communication device in the associating process according to the second embodiment.

The information processing device according to the second embodiment associates the operated operation device with the operation signal, for example, using the table illustrated in B of FIG. 2, similarly to the information processing device according to the first embodiment.

When the associating process according to the second embodiment is performed as the process related to the information processing method according to the second embodiment, the "operated operation device recognized based on the captured image in the device capable of performing the process related to the information processing method according to the first embodiment such as the information processing device 100" is associated with the "operation signal transmitted from the remote controller."

Here, when the operated operation device is recognized based on the captured image in the information processing device 100 or the like, the operation signal received in the information processing device according to the second embodiment is likely to be a transmission signal transmitted from the remote controller in response to the operation.

Thus, the information processing device according to the second embodiment can associate the operation device operated in the remote controller with the operation signal transmitted from the remote controller in response to the operation, similarly to when the information processing method according to the first embodiment described above is used, by performing the associating process according to the second embodiment.

Further, the information processing device according to the second embodiment associates the "operated operation device recognized based on the captured image in the information processing device 100 or the like" with the "operation signal transmitted from the remote controller" as described above. Thus, for example, the user of the information processing device according to the second embodiment need not associate the operation device with the operation signal manually. Further, the information processing device according to the second embodiment can associate the operation device with the operation signal regardless of the data indicating the model number of the remote controller or the like.

[II] Other Process Related to Information Processing Method According to Second Embodiment The process related to the information processing method according to the second embodiment is not limited to the associating process according to the second embodiment.

For example, the information processing device according to the second embodiment may further perform a "process of transmitting an operation signal associated with an operation device indicated by an instruction signal indicating an operation device based on the instruction signal" (hereinafter referred to as a "transmission control process").

The instruction signal according to the present embodiment is, for example, an arbitrary signal indicating the operation device such as a signal indicated by the "remote controller keys" illustrated in B of FIG. 2. For example, the instruction signal is transmitted from the device capable of the process related to the information processing method according to the first embodiment such as the information processing device 100 according to an operation corresponding to the virtual remote controller and received by the communication unit (which will be described later).

For example, when the instruction signal indicating the "remote controller key" is received, the information processing device according to the second embodiment specifies the "remote controller code" corresponding to the "remote controller key" indicated by the instruction signal with reference to the table illustrated in B of FIG. 2. Then, the information processing device according to the second embodiment transmits the operation signal corresponding to the specified "remote controller code" (an example of the operation signal associated with the operation device indicated by the instruction signal).

For example, the information processing device according to the second embodiment causes a communication device constituting a transmitting unit (which will be described later) included in the information processing device according to the second embodiment or an external communication device of the information processing device according to the second embodiment to transmit the operation signal associated with the operation device indicated by the instruction signal. Here, the communication device constituting the transmitting unit (which will be described later) and the communication device constituting the receiving unit (which will be described later) may be the same communication device or may be different communication devices. Similarly, the external communication device that transmits the operation signal associated with the operation device indicated by the instruction signal and the external communication device that receives the operation signal transmitted from the remote controller may be the same communication device or may be different communication devices.

For example, identification information such as an TD indicating a device may be included in the instruction signal according to the present embodiment.

When the identification information is included in the instruction signal, the information processing device according to the second embodiment performs the transmission control process when the identification information indicates the information processing device according to the second embodiment. Further, when the identification information is included in the instruction signal, the information processing device according to the second embodiment does not perform the transmission control process when the identification information does not indicate the information processing device according to the second embodiment.

When the information processing device according to the second embodiment performs the transmission control process selectively based on the identification information as described above, for example, it is possible to implement the case in which "the transmission control process is performed only in a specific information processing device according to the second embodiment corresponding to the identification information even when there are a plurality of information processing devices according to the second embodiment in a certain space."

The information processing device according to the second embodiment may further perform a "process based on a result of detecting a state of the control target (a device controlled by the remote controller)."

The state of the control target is estimated based on, for example, the captured image generated by imaging in an imaging device capable of imaging the control target. For example, when the control target is a television broadcast receiver, it is possible to estimate a state of electric power by detecting whether or not an image is displayed on a display screen of the television broadcast receiver, a color of a power lamp of the television broadcast receiver, or the like based on the captured image. Further, for example, when the control target is an air conditioner, it is possible to estimate a driving state of the air conditioner by detecting a color of a display lamp of the air conditioner or the like based on the captured image.

For example, the state of the control target may be specified such that the information processing device according to the second embodiment performs communication with the control target, and the information processing device according to the second embodiment acquires state information indicating the state of the control target from the control target.

The process based on the result of detecting the state of the control target is, for example, a "process of transmitting information indicating the state of the control target implemented by the operation signal based on the instruction signal as a response to the received instruction signal."

When the information indicating the state of the control target is transmitted to the external device that transmits the instruction signal, the external device can detect the state of the control target. Thus, for example, an operation result can be fed back to the user who has operated the virtual remote controller such that the external device gives either or both of a "visual notification given by causing a character, an image, or the like indicating the detected state of the control target to be displayed on the display screen" and an "auditory notification given by outputting a sound indicating the detected state of the control target through an audio output device such as a speaker."

The process based on the result of detecting the state of the control target is not limited to the "process of transmitting information indicating the state of the control target implemented by the operation signal based on the instruction signal as a response to the received instruction signal."

For example, the information processing device according to the second embodiment may perform a "process of transmitting information indicating the state of the control target to a set predetermined device regularly or irregularly." Here, the predetermined device is, for example, a server that manages the control target or the like.

When the information processing device according to the second embodiment performs the "process of transmitting information indicating the state of the control target to a set predetermined device regularly or irregularly," the information processing device according to the second embodiment may function as, for example, a device that monitors the control target.

[III] Specific Example of Process Related to Information Processing Method According to Second Embodiment Next, a specific example of the process related to the information processing method according to the second embodiment will be described.

Figure 7A:
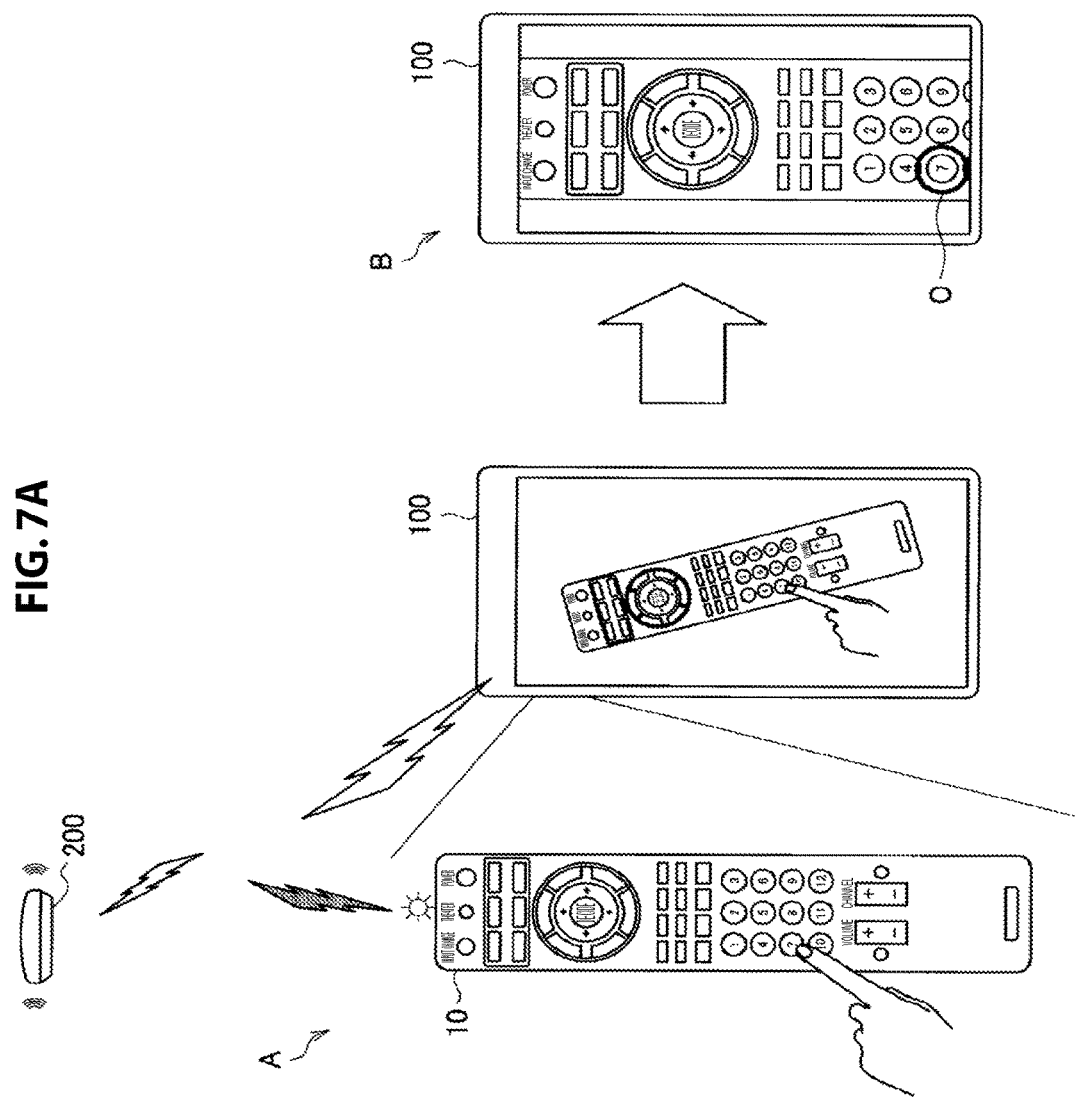
FIG. 7A is an explanatory diagram illustrating an example of a use case implemented by a process related to registration in an information processing method according to a second embodiment.
Figure 7B:
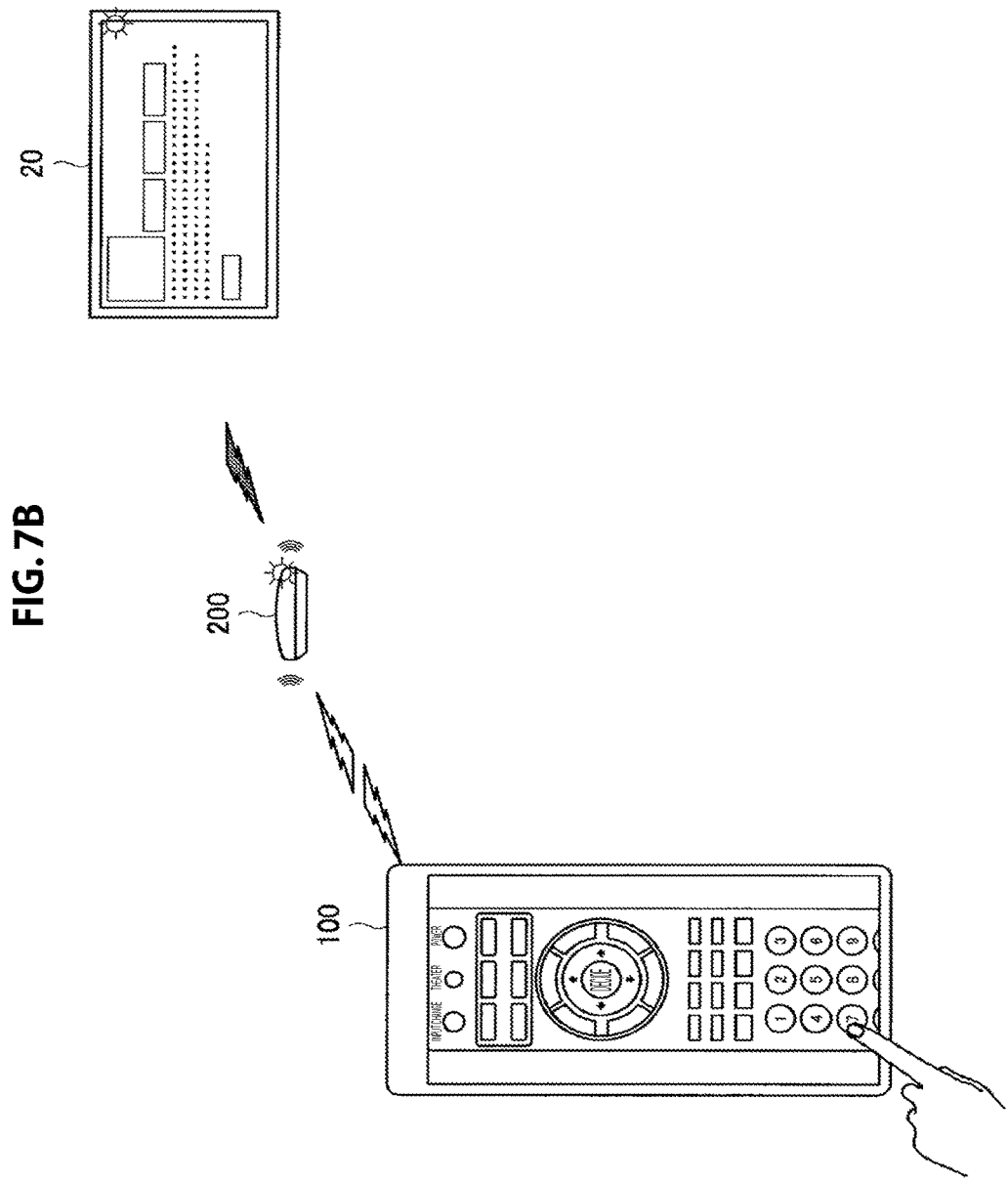
FIG. 7B is an explanatory diagram illustrating an example of a use case implemented by a process related to control in the information processing method according to the second embodiment.

FIG. 7A is an explanatory diagram illustrating an example of a use case implemented by a process related to registration in the information processing method according to the second embodiment. FIG. 7B is an explanatory diagram illustrating an example of a use case implemented by a process related to control in the information processing method according to the second embodiment. In FIGS. 7A and 7B, a device denoted by reference numeral 100 corresponds to an example of the information processing device according to the first embodiment. In FIGS. 7A and 7B, a device denoted by reference numeral 200 corresponds to an example of the information processing device according to the second embodiment. In FIG. 7A, a device denoted by reference numeral 10 corresponds to an example of the remote controller, and in FIG. 7B, a device denoted by reference numeral 20 corresponds to an example of a control target that is controlled by the remote controller.

Hereinafter, a device corresponding to the information processing device according to the first embodiment is referred to as an "information processing device 100", and a device corresponding to the information processing device according to the second embodiment is referred to as an "information processing device 200." Further, hereinafter, a device corresponding to the remote controller is referred to as a "remote controller 10," and a device corresponding to the control target is referred to as a "control target 20." It will be appreciated that the information processing device 100, the information processing device 200, the remote controller 10, and the control target 20 are not limited to those illustrated in FIGS. 7A and 7B.

For example, when the remote controller application is executed in the information processing device 100, communication starts between the information processing device 100 and the information processing device 200. Examples of the communication between the information processing device 100 and the information processing device 200 include arbitrary wireless communication and arbitrary wired communication by which communication can be performed such as communication according to an IEEE802.15.1 standard and communication according to an LEEE802.11 standard. When the communication between the information processing device 100 and the information processing device 200 is communication according to the IEEE802.15.1 standard, a pairing process is performed in the information processing device 100 and the information processing device 200, a communication path is established between the information processing device 100 and the information processing device 200, and then communication starts.

When the registration mode of the remote controller application is selected by an operation performed by the user of the information processing device 100, the imaging device constituting the imaging unit (which will be described later) included in the information processing device 100 is activated.

For example, the user of the information processing device 100 is assumed to perform an operation of pushing down a button (an example of the operation device) included in the remote controller 10 in a state in which the remote controller 10 is imaged by the imaging device as illustrated in A of FIG. 7A.

At this time, the information processing device 100 recognizes the button operated in the remote controller 10 based on the captured image. The information processing device 100 transmits the recognition result of the operated button to the information processing device 200 through the communication path established with the information processing device 200.

The information processing device 200 receives the operation signal transmitted from the remote controller 10 through infrared communication or the like.

The information processing device 200 records the recognition result of the operated button acquired from the information processing device 100 and the received operation signal in, for example, the table illustrated in B of FIG. 2 in association with each other. For example, the table in which the recognition results of the operated operation devices are associated with the operation signals according to the present embodiment is stored in a recording medium constituting a storage unit (which will be described later) included in the information processing device 200 or a recording medium such as an external recording medium of the information processing device 200.

The information processing device 200 transmits the received operation signal to the information processing device 100 through the communication path established with the information processing device 100.

The information processing device 100 records the recognized button and the received operation signal in, for example, the table illustrated in B of FIG. 2 in association with each other.

When the control mode of the remote controller application is selected by an operation performed by the user of the information processing device 100, a virtual remote controller illustrated in B of FIG. 7A is displayed on the display screen, similarly to B of FIG. 1A.

For example, as illustrated in FIG. 7B, when the user of the information processing device 100 pushes down the virtual button serving as the virtual operation device, the information processing device 100 transmits the instruction signal indicating the operation device associated with the pushed virtual button to the information processing device 200 through the communication path established with the information processing device 200. Here, FIG. 7B illustrates an example in which the virtual remote controller is displayed on the display screen of the touch panel, and the instruction signal is transmitted in response to the direct operation on the display screen, similarly to the example illustrated in FIG. 1B.

The information processing device 200 that has received the instruction signal transmits the operation signal associated with the operation device indicated by the instruction signal through communication of a communication scheme that enables the remote controller to transmit the operation signal such as infrared communication.

In response to the operation signal transmitted from the information processing device 200, the control target 20 performs a similar operation to that when the operation signal is transmitted from the remote controller 10.

Figure 8:
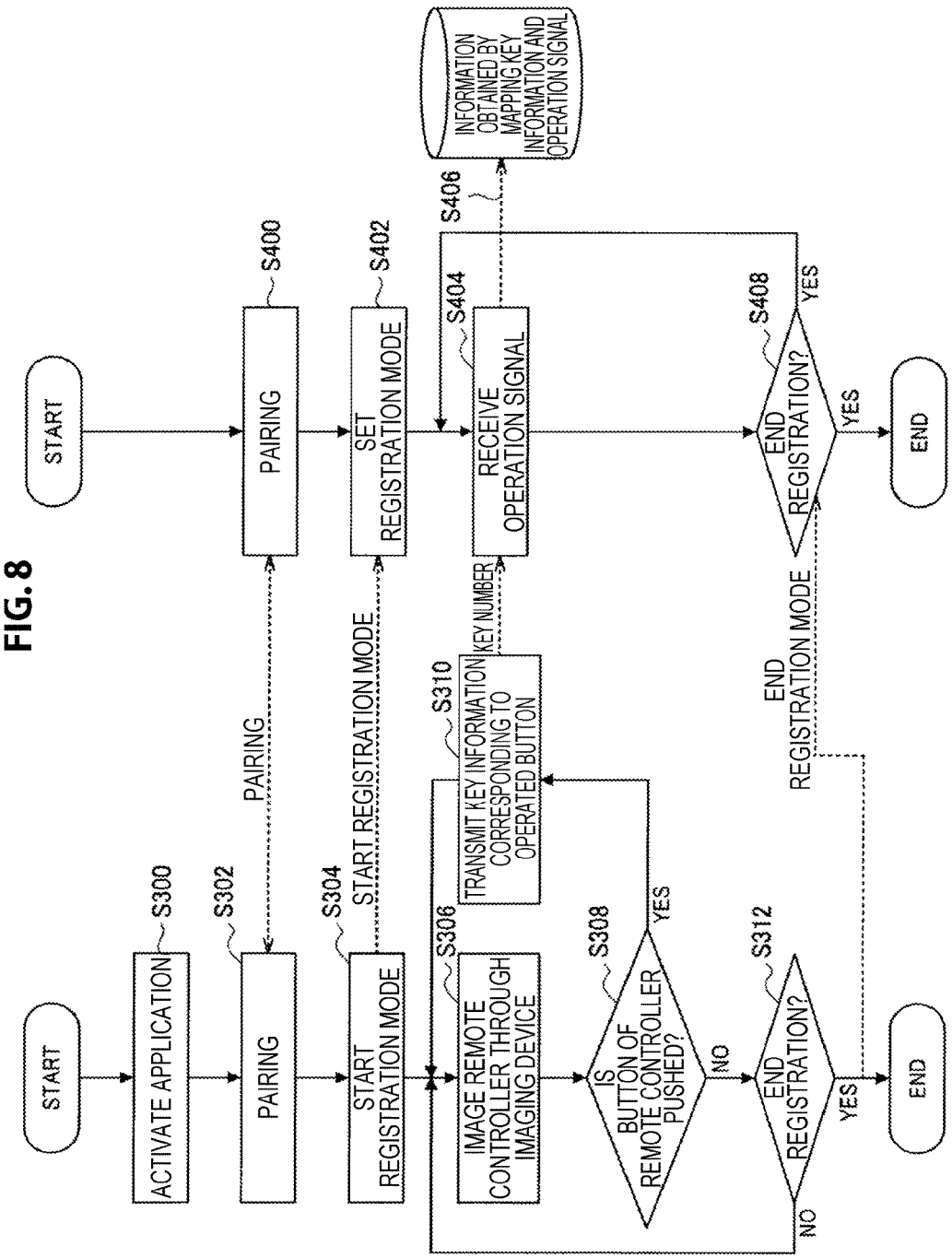
FIG. 8 is a flowchart illustrating an example of a process related to registration in the information processing method according to the second embodiment.
Figure 9:
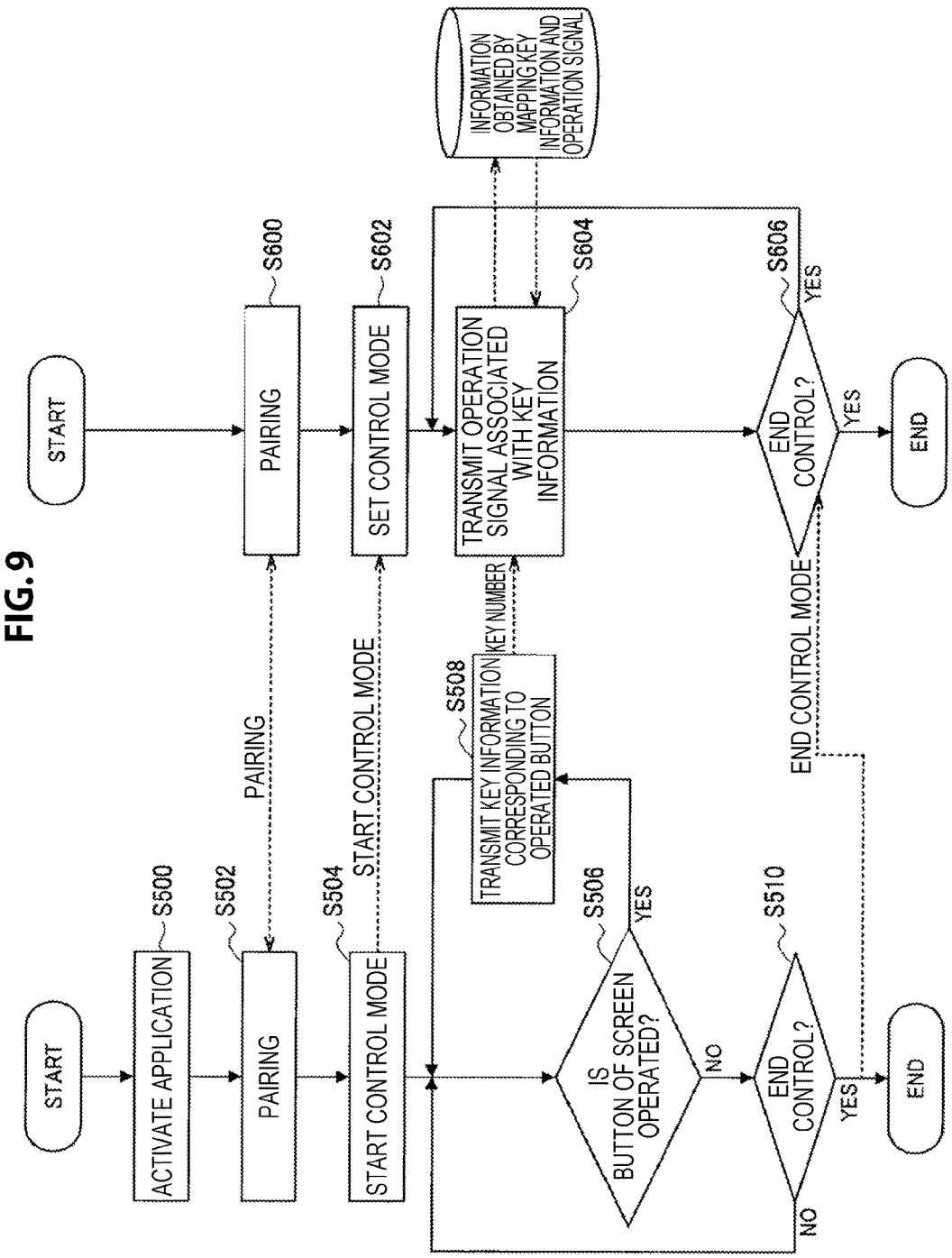
FIG. 9 is a flowchart illustrating an example of a process related to control in the information processing method according to the second embodiment.

FIG. 8 is a flowchart illustrating an example of a process related to registration in the information processing method according to the second embodiment, and FIG. 9 is a flowchart illustrating an example of a process related to control in the information processing method according to the second embodiment. The processes illustrated in FIGS.

8 and 9 illustrate an example of processes in the information processing device 100 and the information processing device 200 which are related to the use case described above with reference to FIGS. 7A and 7B. FIG. 8 illustrates an example of a process when the registration mode of the remote controller application is selected in the information processing device 100, and FIG. 9 illustrates an example of a process when the control mode of the remote controller application is selected in the information processing device 100.

[III-1] Example of Process when Registration Mode of Remote Controller Application is Selected in Information Processing Device 100 (FIG. 8)

An example of processes in the information processing device 100 and the information processing device 200 will be described with reference to FIG. 8.

[III-1-1] Example of Process in Information Processing Device 100

The information processing device 100 activates the remote controller application based on an operation performed by the user or the like (S300). When the remote controller application is activated, the information processing device 100 performs the pairing process (S302), and establishes the communication path with the information processing device 200.

The information processing device 100 sets the registration mode as the operation mode based on an operation performed by the user or the like (S304).

The information processing device 100 controls, for example, the imaging device constituting the imaging unit (not illustrated) such that the remote controller 10 is imaged (S306).

The information processing device 100 determines whether or not the user pushes down the button of the remote controller 10 based on the captured image (S308). The information processing device 100 performs the process of step S308 by recognizing the button pushed on the remote controller 10 based on the captured image, similarly to step S106 of FIG. 3.

When the user is determined to have pushed down the button of the remote controller 10 in step S308, the information processing device 100 transmits key information corresponding to the button in which the operation is recognized (S310). Then, the information processing device 100 repeats the process starting from step S306. Examples of the key information according to the present embodiment include the data indicated by the "remote controller keys" illustrated in B of FIG. 2 and data indicating a number specifying the operation device. The key information transmitted in step S310 corresponds to an example of data indicating the recognition result of the operated operation device.

Further, when the user is determined not to have pushed down the button of the remote controller 10 in step S308, the information processing device 100 determines whether or not to end the registration mode (S312). The information processing device 100 determines to end the registration mode when an operation of ending the registration mode is detected to have been performed.

When the registration mode is determined not to be ended in step S312, the information processing device 100 repeats the process starting from step S306.

When the registration mode is determined to be ended in step S312, the information processing device 100 ends the registration mode and ends the process of FIG. 8.

[III-1-2] Example of Process in Information Processing Device 200

The information processing device 200 performs the pairing process, for example, using the signal transmitted from the information processing device 100 in step S302 as a trigger (S400), and establishes the communication path with the information processing device 100. The information processing device 200 may cause an operation state to transition from a sleep state to a state in which a process can be performed (for example, a state in which main electric power is turned on), for example, using the signal transmitted from the information processing device 100 in step S302 as a trigger.

The information processing device 200 sets the registration mode based on, for example, the information indicating the registration mode transmitted from the information processing device 100 in step S302 (S402).

For example, when the receiving unit (which will be described later) receives the operation signal transmitted from the remote controller 10 (S404), the information processing device 200 records the key information transmitted from the information processing device 100 in step S310 and the operation signal in, for example, the table illustrated in B of FIG. 2 or the like in association with each other (S406). In FIG. 8, information in which the key information and the operation signal are recorded in association with each other is indicated by "information obtained by mapping the key information and the operation signal."

The information processing device 200 determines whether or not to end the registration mode (S408). The information processing device 200 determines to end the registration mode when a signal indicating the end of the registration mode transmitted from the information processing device 100 is received.

When the registration mode is determined not to be ended in step S408, the information processing device 200 repeats the process starting from step S404.

Further, when the registration mode is determined to be ended in step S408, the information processing device 200 ends the registration mode, and ends the process of FIG. 8.

[III-2] Example of Process when Control Mode of Remote Controller Application is Selected in Information Processing Device 100 (FIG. 9)

An example of processes in the information processing device 100 and the information processing device 200 will be described with reference to FIG. 9.

[III-2-1] Example of Process in Information Processing Device 100

The information processing device 100 activates the remote controller application based on an operation performed by the user or the like (S500). When the remote controller application is activated, the information processing device 100 performs the pairing process (S502), and establishes the communication path with the information processing device 200.

The information processing device 100 sets the control mode as the operation mode based on an operation performed by the user or the like (S504).

The information processing device 100 determines whether or not the button displayed on the display screen is operated, similarly to step S206 of FIG. 4 (S506).

When the button displayed on the display screen is determined to have been operated in step S506, the information processing device 100 transmits the key information corresponding to the button in which the operation is recognized (S508). Then, the information processing device 100 repeats the process starting from step S506. Here, the key information transmitted in step S508 corresponds to an example of the instruction signal indicating the operation device.

Further, when the button displayed on the display screen is determined not to have been operated in step S506, the information processing device 100 determines whether or not to end the control mode (S510). When an operation of ending the control mode is detected to be performed, the information processing device 100 determines to end the control mode.

When the control mode is determined not to be ended in step S510, the information processing device 100 repeats the process starting from step S506.

Further, when the control mode is determined to be ended in step S510, the information processing device 100 ends the control mode, and ends the process of FIG. 9.

[III-2-2] Example of Process in Information Processing Device 200

The information processing device 200 performs the pairing process, for example, using the signal transmitted from the information processing device 100 in step S502 as a trigger (S600), and establishes the communication path with the information processing device 100. The information processing device 200 may cause an operation state to transition from a sleep state to a state in which a process can be performed (for example, a state in which main electric power is turned on), for example, using the signal transmitted from the information processing device 100 in step S502 as a trigger.

The information processing device 200 sets the control mode based on, for example, the information indicating the control mode transmitted from the information processing device 100 in step S502 (S602).

When the key information transmitted from the information processing device 100 in step S508 is received, the information processing device 200 transmits the operation signal corresponding to the key information (S604). The information processing device 200 transmits the operation signal corresponding to the key information with reference to information in which the key information and the operation signal are recorded in association with each other such as the table illustrated in B of FIG. 2. In FIG. 9, the information in which the key information and the operation signal are recorded in association with each other is indicated by "information obtained by mapping the key information and the operation signal."

The information processing device 200 determines whether or not to end the control mode (S606). When the signal indicating the end of the control mode transmitted from the information processing device 100 is received, the information processing device 200 determines to end the control mode.

When the control mode is determined not to be ended in step S606, the information processing device 200 repeats the process starting from step S604.

Further, when the control mode is determined to be ended in step S606, the information processing device 200 ends the control mode, and ends the process of FIG. 9.

For example, the process illustrated in FIGS. 8 and 9 is performed in the information processing device 100 and the information processing device 200, and thus the use case described above with reference to FIGS. 7A and 7B is implemented. It will be appreciated that the example of the process related to the information processing method according to the second embodiment is not limited to the example of the process in the information processing device 200 illustrated in FIGS. 8 and 9.

(Information Processing Device According to Second Embodiment)

Next, an example of a configuration of the information processing device according to the second embodiment which is capable of performing the process related to the information processing method according to the second embodiment will be described.

Figure 10:
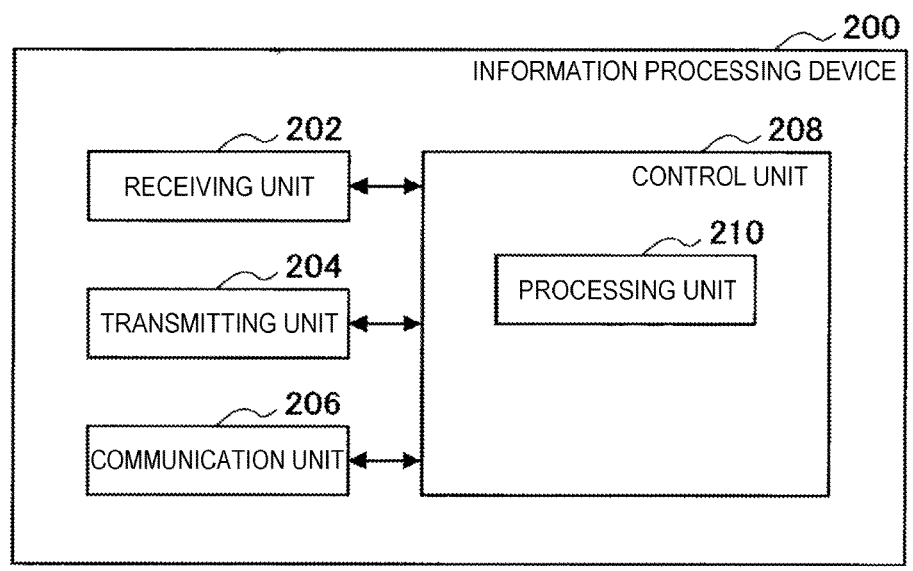
FIG. 10 is a block diagram illustrating an example of a configuration of an information processing device according to the second embodiment.

FIG. 10 is a block diagram illustrating an example of a configuration of the information processing device 200 according to the second embodiment. The information processing device 200 includes, for example, a receiving unit 202, a transmitting unit 204, a communication unit 206, and a control unit 208.

For example, the information processing device 200 may include a ROM (not illustrated), a RAM (not illustrated), a storage unit (not illustrated), an operation unit (not illustrated) that can be operated by the user of the information processing device 200, a display unit (not illustrated) that causes various screens to be displayed on the display screen, and the like. In the information processing device 200, the components are connected to one another, for example, by a bus serving as a data transmission path. For example, the information processing device 200 is driven by electric power supplied from an internal power source such as a battery included in the information processing device 200, electric power supplied from an external power source connected thereto, or the like.

The ROM (not illustrated) stores a program and control data such as operation parameters which are used by the control unit 208. The RAM (not illustrated) temporarily stores, for example, a program executed by the control unit 208.

The storage unit (not illustrated) is a storage device included in the information processing device 200, and stores various data, for example, data related to the information processing method according to the second embodiment such as the table in which the operation devices are associated with the operation signals or various kinds of applications. Here, examples of the storage unit (not illustrated) include a magnetic recording medium such as a hard disk and a non-volatile memory such as a flash memory. The storage unit (not illustrated) may be removably attached to the information processing device 200.

The operation unit (not illustrated) is an operation input device which will be described later. The display unit (not illustrated) is a display device which will be described later.

[Exemplary Hardware Configuration of Information Processing Device 200]

Figure 11:
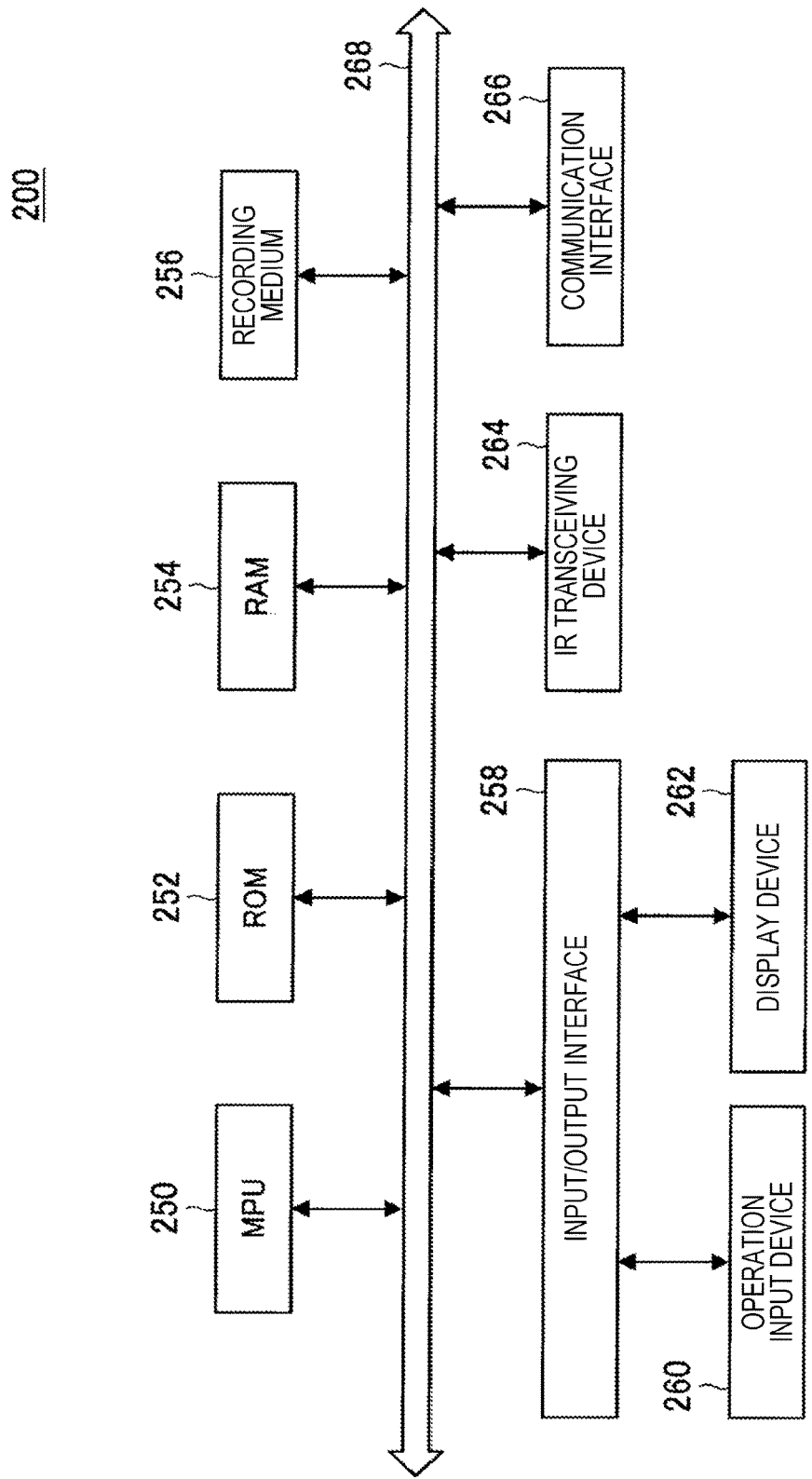
FIG. 11 is an explanatory diagram illustrating an example of a hardware configuration of the information processing device according to the second embodiment.

FIG. 11 is an explanatory diagram illustrating an example of a hardware configuration of the information processing device 200 according to the second embodiment. The information processing device 200 includes, for example, an MPU 250, a ROM 252, a RAM 254, a recording medium 256, an input/output interface 258, an operation input device 260, a display device 262, an IR transceiving device 264, and a communication interface 266. In the information processing device 200, the components are connected to one another, for example, by a bus 268 serving as a data transmission path.

The MPU 250 is configured with, for example, one or more processors configured with an operation circuit such as a MPU, various kinds of processing circuits, and the like and functions as the control unit 208 that controls the information processing device 200 in general. The MPU 250 undertakes, for example, the role of a processing unit 210 (which will be described later) in the information processing device 200. The processing unit 210 may be configured with a dedicated (or general-purpose) circuit (for example, a processor separate from the MPU 250 or the like) capable of performing a process of the processing unit 210.

The ROM 252 stores a program used by the MPU 250, control data such as operation parameters, and the like. The RAM 254 temporarily stores, for example, a program executed by the MPU 250.

The recording medium 256 functions as a storage unit (not illustrated), and stores various data, for example, data related to the information processing method according to the second embodiment such as the table in which the operation devices are associated with the operation signals or various kinds of applications. Here, examples of the recording medium 256 include a magnetic recording medium such as a hard disk and a non-volatile memory such as a flash memory. The recording medium 256 may be removably attached to the information processing device 200.

The input/output interface 258 connects, for example, the operation input device 260 with the display device 262. The operation input device 260 functions as the operation unit (not illustrated), and the display device 262 functions as the display unit (not illustrated). Here, examples of the input/output interface 258 include a USB terminal, a DVI terminal, a HDMI (registered trademark) terminal, and various kinds of processing circuits.

For example, the operation input device 260 is arranged on the information processing device 200 and connected with the input/output interface 258 in the information processing device 200. Examples of the operation input device 260 include a button, a direction key, a rotational selector such as a jog dial, and a combination thereof.

The display device 262 is arranged on, for example, the information processing device 200 and connected with the input/output interface 258 in the information processing device 200. Examples of the display device 262 include an LCD and an organic EL display.

It will be appreciated that the input/output interface 258 can be connected with an external device such as an external operation input device of the information processing device 200 (for example, a keyboard, a mouse, or the like) or an external display device. The display device 262 may be, for example, a device on which display and a user operation can be performed such as the touch panel.

The IR transceiving device 264 is a communication device included in the information processing device 200 and performs transmission and reception of a signal through infrared rays. The IR transceiving device 264 functions as the receiving unit 202 that receives the transmission signal transmitted from the remote controller and the transmitting unit 204 that transmits the operation signal.

The communication interface 266 is another communication device included in the information processing device 200 and functions as a communication unit (not illustrated) that performs communication with an external device, such as the information processing device 100, in a wireless or wired manner via a network (or directly). Here, examples of the communication interface 266 include a communication antenna and a RF circuit (wireless communication), an IEEE 802.15.1 port and a transceiving circuit (wireless communication), an IEEE 802.11 port and a transceiving circuit, and a LAN terminal and a transceiving circuit (wired communication).

The information processing device 200 performs the process related to the information processing method according to the second embodiment through, for example, the configuration illustrated in FIG. 11. The hardware configuration of the information processing device 200 according to the second embodiment is not limited to the configuration illustrated in FIG. 11.

For example, the information processing device 200 may not include the IR transceiving device 264 when communication with an external device is performed through an external IR transceiving device connected thereto.

Instead of the IR transceiving device 264, for example, the information processing device 200 may include a communication device corresponding to an arbitrary communication scheme used for transmission of the operation signal by the remote controller. Here, the communication device corresponding to an arbitrary communication scheme used for transmission of the operation signal by the remote controller functions as the receiving unit 202 and the transmitting unit 204.

The information processing device 200 may include, for example, a communication device functioning as the receiving unit 202 and a communication device functioning as the transmitting unit 204.

For example, the information processing device 200 may not include the communication interface 266 when communication with an external device such as the information processing device 100 is performed through an external communication device corresponding to the communication interface 266.

The information processing device 200 may further include an imaging device that functions as an imaging unit (not illustrated).

Further, the information processing device 200 may employ, for example, a configuration in which one or more of the recording medium 256, the operation input device 260, and the display device 262 are not arranged.

Further, the information processing device 200 may have, for example, a configuration according to an application example of the information processing device 200 which will be described later.

For example, a part or all of the configuration illustrated in FIG. 11 (or a configuration according to a modified example) may be implemented by one or more ICs.

An example of a configuration of the information processing device 200 will be described with reference back to FIG. 10. The receiving unit 202 receives the operation signal transmitted from the remote controller. The receiving unit 202 is, for example, the IR transceiving device 264.

The transmitting unit 204 transmits the operation signal. The transmitting unit 204 is, for example, the IR transceiving device 264.

The communication unit 206 performs communication with an external device capable of performing the process related to the information processing method according to the first embodiment such as the information processing device 100. The communication unit 206 is, for example, the communication interface 266.

The control unit 208 is configured with, for example, an MPU or the like and undertakes a role of controlling the information processing device 200 in general. The control unit 208 includes, for example, the processing unit 210 and undertakes a role of initiatively performing the process related to the information processing method according to the second embodiment.

The processing unit 210 undertakes a role of initiatively performing the process related to the information processing method according to the second embodiment.

The processing unit 210 performs, for example, the associating process according to the second embodiment, and associates the operated operation device with the operation signal based on the recognition result of the operated operation device received by the communication unit 206 and the operation signal received by the receiving unit 202.

For example, the processing unit 210 may further perform either or both of the transmission control process and the process based on the result of detecting the state of the control target.

The information processing device 200 performs the process related to the information processing method according to the second embodiment through, for example, the configuration illustrated in FIG. 10. Thus, the information processing device 200 can associate the operation device operated in the remote controller with the operation signal transmitted from the remote controller in response to the operation through, for example, the configuration illustrated in FIG. 10.

Further, the information processing device 200 can have an effect obtained by performing the process related to the information processing method according to the second embodiment through, for example, the configuration illustrated in FIG. 10.

The configuration of the information processing device according to the second embodiment is not limited to the configuration illustrated in FIG. 10.

For example, in the information processing device according to the second embodiment, the processing unit 210 illustrated in FIG. 10 may be arranged separately from the control unit 208 (for example, may be implemented by a separate processing circuit). The processing unit 210 may be implemented by a plurality of processing circuits, and the function of the processing unit 210 may be distributedly performed by a plurality of processing circuits.

The configuration for implementing the process related to the information processing method according to the second embodiment is not limited to the configuration illustrated in FIG. 10, and a configuration according to a division form of the process related to the information processing method according to the second embodiment may be employed.

Further, for example, when communication with an external device is performed through an external communication device with a function and configuration similar to those of the receiving unit 202, the information processing device according to the second embodiment may not include the receiving unit 202. When the information processing device according to the second embodiment is configured not to include the receiving unit 202, the processing unit 210 associates the operated operation device with the operation signal based on the operation signal received by the external communication device.

Further, for example, when communication with an external device is performed through an external communication device with a function and configuration similar to those of the transmitting unit 204, the information processing device according to the second embodiment may not include the transmitting unit 204. When the information processing device according to the second embodiment is configured not to include the transmitting unit 204, the processing unit 210 transmits the operation signal to the external communication device.

Further, for example, when communication with an external device such as the information processing device 100 is performed through an external communication device having a function and configuration similar to those of the communication unit 206, the information processing device according to the second embodiment may not include the communication unit 206.

The information processing device according to the second embodiment may further include an imaging unit (not illustrated). When the imaging unit (not illustrated) is further arranged, the processing unit 210 performs the process based on the result of detecting the state of the control target based on, for example, the captured image generated by the imaging unit (not illustrated).

The second embodiment has been described using the information processing device as an example, but the second embodiment is not limited to this example. For example, the second embodiment can be applied to various devices capable of performing the process related to the information processing method according to the second embodiment such as a "device that functions as an accessory of the information processing device according to the first embodiment" and an "arbitrary device installed in a space (or an environment) such as a clock, a light fixture, or a speaker." For example, the second embodiment can be applied a processing IC that can be incorporated into the above devices.

(Program According to Present Embodiment)

[i] Program According to First Embodiment

The operation device operated in the remote controller can be associated with the operation signal transmitted from the remote controller in response to the operation by executing a program causing a computer to function as the information processing device according to the first embodiment (for example, a program capable of executing the process related to the information processing method according to the first embodiment such as the "associating process according to the first embodiment" or the "associating process according to the first embodiment and the virtual remote controller control process") through a processor or the like in the computer.

Further, it is possible to obtain the effect obtained by the process related to the information processing method according to the first embodiment by executing a program causing a computer to function as the information processing device according to the first embodiment through a processor or the like in the computer.

[ii] Program According to Second Embodiment

The operation device operated in the remote controller can be associated with the operation signal transmitted from the remote controller in response to the operation by executing a program causing a computer to function as the information processing device according to the second embodiment (for example, a program capable of executing the process related to the information processing method according to the second embodiment such as the "associating process according to the second embodiment," the "associating process according to the second embodiment and the transmission control process," the "associating process according to the second embodiment and the process based on the result of detecting the state of the control target," and the "associating process according to the second embodiment, the transmission control process, and the process based on the result of detecting the state of the control target") through a processor or the like in the computer.

Further, it is possible to obtain the effect obtained by the process related to the information processing method according to the second embodiment by executing a program causing a computer to function as the information processing device according to the second embodiment through a processor or the like in the computer.

It should be understood by those skilled in the art that various modifications, combinations, sub-combinations and alterations may occur depending on design requirements and other factors insofar as they are within the scope of the appended claims or the equivalents thereof.

For example, the example in which the program (computer program) causing the computer to function as the information processing device according to the first embodiment is provided has been described, but in the present embodiment, the recording medium including the program stored therein may also be provided.

Further, for example, the example in which the program (computer program) causing the computer to function as the information processing device according to the second embodiment is provided has been described, but in the present embodiment, the recording medium including the program stored therein may also be provided.

The above configurations are examples of the present embodiment and understood to be included in the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Additionally, the present technology may also be configured as below.

(1) An information processing device, including
a processing unit configured to associate, based on a captured image obtained by imaging a remote controller including an operation device and an operation signal transmitted from the remote controller in response to an operation on the operation device, the operated operation device with the operation signal.
(2) The information processing device according to (1),
wherein the processing unit
recognizes the operated operation device based on the captured image, and
associates the recognized operation device with the operation signal.
(3) The information processing device according to (1) or (2),
wherein the processing unit generates a virtual remote controller, and causes the virtual remote controller to be displayed on a display screen, and
the virtual remote controller includes a virtual operation device that corresponds to the operation device associated with the operation signal and is operable.
(4) The information processing device according to (3),
wherein an arrangement of the virtual operation device in the virtual remote controller is identical to an arrangement of the operation device in the remote controller.
(5) The information processing device according to (3) or (4),
wherein an arrangement of the virtual operation device in the virtual remote controller is different from an arrangement of the operation device in the remote controller.
(6) The information processing device according to any one of (3) to (5),
wherein the virtual remote controller is configured with only the virtual operation device.
(7) The information processing device according to any one of (3) to (6),
wherein the processing unit causes the virtual operation device to be explicitly indicated.
(8) The information processing device according to any one of (3) to (7),
wherein, when an operation on the virtual operation device is detected, the processing unit causes the operation signal to be transmitted, the operation signal corresponding to the virtual operation device in which the operation is detected and being associated with the operation device.
(9) The information processing device according to (8), further including
a transmitting unit configured to transmit the operation signal,
wherein the processing unit causes the transmitting unit to transmit the operation signal.
(10) The information processing device according to any one of (1) to (9), further including
an imaging unit configured to generate the captured image,
wherein the processing unit associates the operated operation device with the operation signal based on the captured image generated by the imaging unit.
(11) The information processing device according to any one of (1) to (10), further including
a receiving unit configured to receive the operation signal,
wherein the processing unit associates the operated operation device with the operation signal based on the operation signal received by the receiving unit.
(12) An information processing device, including:
a receiving unit configured to receive an operation signal transmitted from a remote controller in response to an operation on an operation device included in the remote controller;
a communication unit configured to perform communication with an external device capable of recognizing the operated operation device based on a captured image obtained by imaging the remote controller; and
a processing unit configured to associate the operated operation device with the operation signal based on a recognition result of the operated operation device transmitted from the external device and the operation signal transmitted from the remote controller.
(13) The information processing device according to (12),
wherein, when the communication unit receives an instruction signal indicating the operation device, the processing unit causes the operation signal associated with the operation device indicated by the instruction signal to be transmitted.
(14) The information processing device according to (13), further including
a transmitting unit configured to transmit the operation signal,
wherein the processing unit causes the transmitting unit to transmit the operation signal.
(15) The information processing device according to any one of (12) to (14),
wherein the processing unit further performs a process based on a result of detecting a state of a control target that is controlled by the remote controller.
(16) An information processing method performed in an information processing device, including:
associating, based on a captured image obtained by imaging a remote controller including an operation device and an operation signal transmitted from the remote controller in response to an operation on the operation device, the operated operation device with the operation signal.
(17) An information processing method performed in an information processing device, including:
associating, based on a recognition result of an operated operation device transmitted from an external device capable of recognizing the operated operation device based on a captured image obtained by imaging a remote controller including the operation device and an operation signal according to the operation transmitted from the remote controller, the operated operation device with the operation signal.

(18) A program for causing a computer to execute a function of:

associating, based on a captured image obtained by imaging a remote controller including an operation device and an operation signal transmitted from the remote controller in response to an operation on the operation device, the operated operation device with the operation signal.

What is claimed is:

1. An information processing device, comprising circuitry configured to
   receive a captured image obtained by imaging a remote controller including an operation device and an operating body positioned to operate the operation device such that the remote controller, the operation device, and the operating body are shown in the captured image;
   receive an operation signal transmitted from the remote controller in response to an operation on the operation device by the operating body; and
   associate the operated operation device with the operation signal in accordance with the captured image.

2. The information processing device according to claim 1,
   wherein the circuitry is configured to recognize the operated operation device based on the captured image, and to associate the recognized operation device with the operation signal.

3. The information processing device according to claim 1,
   wherein the circuitry is configured to generate a virtual remote controller, and to cause the virtual remote controller to be displayed on a display screen, and
   the virtual remote controller includes a virtual operation device that corresponds to the operation device associated with the operation signal and is operable.

4. The information processing device according to claim 3,
   wherein an arrangement of the virtual operation device in the virtual remote controller is identical to an arrangement of the operation device in the remote controller.

5. The information processing device according to claim 3,
   wherein an arrangement of the virtual operation device in the virtual remote controller is different from an arrangement of the operation device in the remote controller.

6. The information processing device according to claim 3,
   wherein the virtual remote controller is configured with only the virtual operation device.

7. The information processing device according to claim 3,
   wherein the circuitry is configured to cause the virtual operation device to be explicitly indicated.

8. The information processing device according to claim 3,
   wherein, when an operation on the virtual operation device is detected, the circuitry is configured to cause the operation signal to be transmitted, the operation signal corresponding to the virtual operation device in which the operation is detected and being associated with the operation device.

9. The information processing device according to claim 8, wherein the circuitry is further configured to transmit the operation signal.

10. The information processing device according to claim 1, wherein the circuitry is further configured to generate the captured image.

11. The information processing device according to claim 1, wherein the circuitry is further configured to receive the operation signal.

12. The information processing device according to claim 1, wherein the operating body is a finger of a user of the remote controller.

13. The information processing device according to claim 1, wherein the remote controller is a handheld remote controller.

14. The information processing device according to claim 1, wherein the operation device is a button of the remote controller.

15. An information processing device, comprising:
    circuitry configured to
    receive an operation signal transmitted from a remote controller in response to an operation on an operation device included in the remote controller by an operating body;
    perform communication with an external device capable of recognizing the operated operation device based on a captured image obtained by imaging the remote controller and the operating body positioned to operate the operation device such that the remote controller, the operation device, and the operating body are shown in the captured image; and
    associate the operated operation device with the operation signal based on a recognition result of the operated operation device transmitted from the external device and the operation signal transmitted from the remote controller.

16. The information processing device according to claim 15,
    wherein, when the circuitry receives an instruction signal indicating the operation device, the circuitry transmits the operation signal associated with the operation device indicated by the instruction signal.

17. The information processing device according to claim 16, wherein the circuitry is further configured to transmit the operation signal.

18. The information processing device according to claim 15,
    wherein the processing unit further performs a process based on a result of detecting a state of a control target that is controlled by the remote controller.

19. An information processing method performed in an information processing device, comprising:
    receiving, using circuitry, a captured image obtained by imaging a remote controller including an operation device and an operating body positioned to operate the operation device such that the remote controller, the operation device, and the operating body are shown in the captured image;
    receiving, using the circuitry, an operation signal transmitted from the remote controller in response to an operation on the operation device by the operating body; and
    associating, using the circuitry, the operated operation device with the operation signal in accordance with the captured image.

20. An information processing method performed in an information processing device, comprising:

receiving, using circuitry, a recognition result of an operated operation device transmitted from an external device capable of recognizing the operated operation device based on a captured image obtained by imaging a remote controller including the operation device and an operating body positioned to operate the operation device such that the remote controller, the operation device, and the operating body are shown in the captured image;

receiving, using the circuitry, an operation signal transmitted from the remote controller in response to an operation on the operation device by the operating body; and associating, using the circuitry, the operated operation device with the operation signal in accordance with the recognition result.

21. A non-transitory, computer-readable medium storing a program that, when executed by a computer, controls the computer to execute a function of:

receiving a captured image obtained by imaging a remote controller including an operation device and an operating body positioned to operate the operation device such that the remote controller, the operation device, and the operating body are shown in the captured image;

receiving an operation signal transmitted from the remote controller in response to an operation on the operation device by the operating body; and associating the operated operation device with the operation signal in accordance with the captured image.

* * * * *